US008469802B2

(12) United States Patent
Luciano, Jr. et al.

(10) Patent No.: US 8,469,802 B2
(45) **Date of Patent: *Jun. 25, 2013**

(54) ENHANCED GAME PLAY AWARDS AND USE IN GAMING ENVIRONMENTS

(75) Inventors: Robert Anthony Luciano, Jr., Reno, NV (US); Robert William Crowder, Jr., Las Vegas, NV (US); Russ F. Marsden, Gardnerville, NV (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 13/301,711

(22) Filed: Nov. 21, 2011

(65) Prior Publication Data

US 2012/0071233 A1 Mar. 22, 2012

Related U.S. Application Data

(63) Continuation of application No. 12/698,908, filed on Feb. 2, 2010, now Pat. No. 8,062,125, which is a continuation of application No. 09/788,162, filed on Feb. 15, 2001, now Pat. No. 7,682,244, which is a continuation-in-part of application No. 09/742,679, filed on Dec. 20, 2000, now Pat. No. 6,923,721.

(51) Int. Cl.
*A63F 9/24* (2006.01)
*A63F 13/00* (2006.01)

(52) U.S. Cl.
USPC .................. 463/25; 463/16; 463/17; 463/18; 463/19; 463/20; 463/29

(58) Field of Classification Search
USPC .......................................... 463/16–20, 25, 29
See application file for complete search history.

(56) References Cited

U.S. PATENT DOCUMENTS

| | | | |
|---|---|---|---|
| 4,339,798 | A | 7/1982 | Hedges et al. |
| 4,398,720 | A | 8/1983 | Jones et al. |
| 4,752,068 | A | 6/1988 | Endo |
| 4,858,930 | A | 8/1989 | Sato |
| 4,882,473 | A | 11/1989 | Bergeron et al. |
| 4,948,138 | A | 8/1990 | Pease et al. |
| 5,265,874 | A | 11/1993 | Dickinson |
| 5,292,127 | A | 3/1994 | Kelly et al. |
| 5,321,241 | A | 6/1994 | Craine |
| 5,365,575 | A | 11/1994 | Katz |
| 5,370,306 | A | 12/1994 | Schulze |
| 5,370,399 | A | 12/1994 | Liverance |
| 5,429,361 | A | 7/1995 | Raven et al. |
| 5,470,079 | A | 11/1995 | LeStrange et al. |

(Continued)

*Primary Examiner* — Arthur O. Hall
*Assistant Examiner* — Jasson Yoo
(74) *Attorney, Agent, or Firm* — Brooke Quist; Marvin Hein

(57) ABSTRACT

A method is shown for enhancing game play on a gaming machine. In one embodiment, the gaming machine may include a processor, a memory, and program logic stored in the memory that may be executable to play a base game in exchange for a wager. The method includes receiving a Newprom award that is not issued by the gaming machine. The method may include altering, using the processor, the base game to an enhanced base game state in response to the Newprom award. The Newprom award may be configured to add one or more base game play enhancements available to a player only by way of the Newprom award to the base game. This may alter the base game to the enhanced base game state so that the base game is played with the one or more game play enhancements.

20 Claims, 23 Drawing Sheets

Enhanced Wheel of Fortune™ Game

Poker to Drop Stones Game

U.S. PATENT DOCUMENTS

| | | | | |
|---|---|---|---|---|
| 5,533,727 | A | 7/1996 | DeMar | |
| 5,573,244 | A | 11/1996 | Mindes | |
| 5,580,053 | A | 12/1996 | Crouch | |
| 5,580,309 | A | 12/1996 | Piechowiak | |
| 5,586,766 | A | 12/1996 | Forte et al. | |
| 5,655,961 | A | 8/1997 | Acres | |
| 5,674,128 | A | 10/1997 | Holch | |
| 5,702,304 | A | 12/1997 | Acres | |
| 5,741,183 | A | 4/1998 | Acres | |
| 5,743,523 | A | 4/1998 | Kelly | |
| 5,743,800 | A | 4/1998 | Huard et al. | |
| 5,751,707 | A | 5/1998 | Voit et al. | |
| 5,752,882 | A | 5/1998 | Acres | |
| 5,761,647 | A | 6/1998 | Boushy | |
| 5,770,533 | A | 6/1998 | Franchi | |
| 5,816,918 | A | 10/1998 | Kelly et al. | |
| 5,820,459 | A | 10/1998 | Acres | |
| 5,830,068 | A | 11/1998 | Brenner et al. | |
| 5,833,540 | A | 11/1998 | Miodunski | |
| 5,836,817 | A | 11/1998 | Acres et al. | |
| 5,902,983 | A | 5/1999 | Crevelt | |
| 5,919,091 | A | 7/1999 | Bell | |
| 5,931,467 | A | 8/1999 | Kamille | |
| 5,999,808 | A | 12/1999 | LaDue | |
| 6,007,426 | A | 12/1999 | Kelly et al. | |
| 6,015,344 | A | 1/2000 | Kelly et al. | |
| 6,019,374 | A | 2/2000 | Breeding | |
| 6,024,640 | A | 2/2000 | Walker et al. | |
| 6,048,269 | A | 4/2000 | Burns | |
| 6,068,552 | A | 5/2000 | Walker et al. | |
| 6,110,041 | A | 8/2000 | Walker et al. | |
| 6,162,122 | A | 12/2000 | Acres | |
| 6,165,071 | A | 12/2000 | Weiss | |
| 6,179,710 | B1 | 1/2001 | Sawyer et al. | |
| 6,203,430 | B1 | 3/2001 | Walker et al. | |
| 6,213,874 | B1 * | 4/2001 | Heflin | 463/17 |
| 6,227,972 | B1 | 5/2001 | Walker et al. | |
| 6,293,866 | B1 | 9/2001 | Walker et al. | |
| 6,306,038 | B1 | 10/2001 | Graves et al. | |
| 6,319,122 | B1 | 11/2001 | Packes, Jr. et al. | |
| 6,364,765 | B1 | 4/2002 | Walker et al. | |
| 6,371,852 | B1 * | 4/2002 | Acres | 463/25 |
| 6,527,638 | B1 | 3/2003 | Walker et al. | |
| 6,533,273 | B2 | 3/2003 | Cole et al. | |
| 6,612,574 | B1 | 9/2003 | Cole et al. | |
| 6,656,047 | B1 | 12/2003 | Tarantino et al. | |
| 7,192,352 | B2 | 3/2007 | Walker et al. | |
| 7,682,244 | B1 * | 3/2010 | Luciano et al. | 463/25 |
| 8,062,125 | B2 * | 11/2011 | Luciano et al. | 463/25 |
| 2001/0009865 | A1 | 7/2001 | Demar et al. | |

* cited by examiner

Example Award
Credit System

Meta - Games According To
The Present Invention

Award Credit Accounting
With Back End Validation Device

Example Voucher

Gaming Device and Prize Station On One Physical Machine

Award Credits On Multiple Machines

Award Credits in a Network Environment

Gaming Device Details

Prize Station Device Details

Further Meta-Game Examples

The value of a prize at any level is deemed to be one-half the value of the prizes one level above itself and twice the value of the prizes on level below itself.

Hierarchical Prize Levels

Game State Saving Game
With Credits

Game State Saving Game
With Skill Points

Example Award Credit, Game State, and Promotional Credit System

Example Elements Used to Determine Promotional Credit Issuance

Generally Applicable Elements

1 Time Restrictions

2 Location Restrictions

3 Gaming Device Restrictions

4 Game Play Enhancements

5 Award Level Enhancements

6 Triggering Events

7 Distribution Means

Fig.15-A

Simplified Example ofElement States Used with Enhanced Wheel of Fortune™ Gaming Devices 1 Time Restrictions: 5 States
(Minutes, Hours, Days, Weeks, Months)

2 Location Restrictions: 1 State
(Single Issuing Establislhment)

3 Gaming Device Restrictions: 1 State
(Applicable Only to Enhance Wheel of Fortune™ gaming devices)

4 Game Play Enhancements: 2 States
(Additional Active Pointers, Jackpot Window)

5 Award Level Enhancements: 1 State
(Peripheral Indicia)

6 Triggering Events: 2 States
(Time Plalyed, Amount Spent)

7 Distribution Means: 3 States
(At Gaming Device, Targeted Mailings, Mass Local Mailings)

Fig.15-B

Enhanced Wheel of Fortune™ Game

Poker to Drop Stones Game

Method of Determining Promotion Awards (Newprom Awards)

Method of Using Newprom Awards

Promotional Credit Status Device

General Bearer Instrument (GBI) Service Station

Example Use of GBI Service Station

ENHANCED GAME PLAY AWARDS AND USE IN GAMING ENVIRONMENTS

CROSS-REFERENCE TO RELATED APPLICATIONS

This application is a continuation of U.S. patent application Ser. No. 12/698,908, filed on Feb. 2, 2010, which is a continuation of U.S. patent application Ser. No. 09/788,162, filed on Feb. 15, 2001, now U.S. Pat. No. 7,682,244, issued Mar. 23, 2010, which is a continuation-in-part of U.S. patent application Ser. No. 09/742,679, filed Dec. 20, 2000, now U.S. Pat. No. 6,923,721, issued Aug. 2, 2005.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

This disclosure generally relates to gaming systems. More particularly, this disclosure relates to a method and apparatus for promoting, encouraging, and rewarding targeted gaming device play.

2. Description of the Related Art

Gaming devices of various types have been in use for many years. The most common type is the conventional slot. A player operates a slot machine by providing coin, paper money, or tokens that are received as game credits towards playing a game on the slot machine. Some machines allow a user to provide game credits in the form of a voucher, a printed coupon or a data card (e.g. magnetic strip or smart card). Once the sufficient amount of game credits has been provided to constitute a wager, the player then initiates the game, normally by pulling a handle or activating a button. If a winning event occurs, where a winning event is defined by the game being played, the slot machine issues a winning amount according to the player's wager and to a predetermined pay scheme. The game results are generally based on randomly generated events. The winning amount issued to the user is provided by a corresponding amount of game credits, which the player may redeem (cash-out) or use for further play on the slot machine. Similar game play and award schemes are provided according to other gaming devices such as video poker machines and keno machines.

Bonus and progressive awards have been introduced as improvements to conventional gaming devices to entice increased game play. A common bonus scheme is to award a player a chance to multiply the player's award winnings on a secondary or bonus stage of the game. Most bonus awards are simply an increased multiple of the primary winnings and are issued as game credits suitable for redemption or further play of the gaming device currently being played. In certain cases where the bonus award is large, manual payout by a casino attendant may be required. In some cases a non-monetary prize (e.g., a car) is made the subject of the bonus award. Like the larger monetary progressive awards, these nonmonetary prizes are normally tendered manually by a casino attendant.

Progressive awards, like bonus awards, also normally comprise simple monetary credits, but typically comprise a large jackpot amount. Progressive awards couple more than one gaming machine, where some amount of the money a player spends at each gaming machine goes into a central award or "pot". The players of each coupled machine compete for the progressive award. The overall result is that a significantly larger award can be won by a player playing progressive games at a coupled machine than can be won at an individual gaming machine. Upon the occurrence of a specific game result, the progressive award is issued to the player. Since the progressive award is normally large, it is normally paid manually by a casino attendant or cashier.

Another prior art gaming implementation is known as "investment bonus". An example of this type of game is the 1937 Mills "Bonus Bell" game which provides a primary slot reel game and a secondary investment bonus game (or "come-on" feature). During play the word "BONUS" could be spelled out by hitting the correct letters in sequence on the first reel for an eighteen (18) coin award. This type of game is generally referred to as an "investment bonus" game, because the player invests in continued play of the same machine to achieve the requirements for the bonus award (e.g., in the Mills' game completing the word "BONUS"). If the player were to terminate play of the investment game prior to completing the requirements for the bonus award (e.g., the player only completes "BON"), the player normally forfeits the player's prior investments ("BON") and must later fulfil the requirements anew. Furthermore, a subsequent player may "take over" a previous player's investment by commencing play of the investment bonus game after the previous player vacates the machine.

Current gaming devices and methods, while suitable for normal award credit payout and one-time non-monetary prize payout, have some particular disadvantages. First, current gaming schemes are not well suited for awarding prizes having a hierarchical arrangement which require a player to collect two or more "winning events" towards the redemption of an award. This is especially true where the winning events may be derived from two or more gaming machines. For example, in conventional bonus, secondary, or investment bonus games, the player may accumulate points towards redemption of a bonus prize. An example of such points may be spaces on a game board such as tic-tac-toe or Monopoly™ or in the case of the Mills game, a collection of letters to form the word "BONUS." Once the player has accumulated the sufficient number of (e.g., collection of or arrangement of) game points, the player may be awarded a bonus prize. However, current systems do not allow a player to collect the player's game points on one machine for usage on a secondary machine for further collection of points toward prize redemption. Nor do current systems provide the collection of points on one machine for redemption of awards on another machine or a central (or separate) prize station. Current systems also fail to provide for collection of points on one machine for later aggregation with the same machine during subsequent play.

Furthermore, current systems do not provide for a multi-level or investment style schemes for non-monetary prizes. As noted above, current bonus or progressive prizes present a single jackpot, perhaps at various prize levels. However, current systems fail to provide for accumulation of lower prize awards for subsequent opportunities at achieving higher level award prizes based on the accumulation of lower prize awards.

Current gaming machines also have limited, if any, ability to incorporate non-gaming, intra-gaming, or inter-gaming promotional awards into game play, precluding a potential source of player participation and interest.

Current systems that have attempted to partially address some of these limitations of individual gaming devices are themselves still limited. The attempted solutions fall into two broad categories: player tracking points and some sort of promotional coupons or credits.

Player tracking points usually takes the form of players identifying themselves to a central server in a particular casino via the gaming machines using a player ID card (typically a magnetic strip card). The central server tracks the number of play ("lever pulls") or amount of money a player wagers. Depending on the amount of plays or money wagered, the player is given player points, translating into various prizes ("comps") given by the casino to the player.

Promotional credits are usually some form of coupon or ticket that, when redeemed at a particular casino, will give the player a certain number of free game plays. The coupons function like tokens; in fact, it is usually the case that the coupons are redeemed for tokens and the player then uses the tokens in the games of their choice.

These solutions have significant limitations. The awards or credits are casino-wide, having no further method of targeting usage. The awards are based on simple, linear criteria (i.e., given away in a generic form or based on a single element having a one dimensional scale such as amount of money wagered). Additionally the effect on gaming devices is limited to free play (additional game credits).

Thus, there is a long-felt need to improve upon the current methods and apparatus for providing additional incentive to playing games that goes beyond the relatively simple awards of game play credits or casino-wide comps.

According to some jurisdictions, gaming is restricted to lottery-based play, where a game result is selected from a fixed pool of outcomes, rather than from a randomly generated event. These systems also provide for similar bonus or progressive structures as described above utilizing fixed-pool schemes. The needs outlined above for an award and redemption system having movable game points or credits are also needed in lottery-based gaming environments.

SUMMARY

Briefly, and in general terms, various embodiments are directed to a method for enhancing game play on a gaming machine.

In some embodiments, a gaming machine may include a processor, a memory, and program logic stored in the memory that may be executable to play a base game in exchange for a wager. In some embodiments, a method for enhancing game play on a gaming machine may include receiving a Newprom award that is not issued by the gaming machine. The method may further include altering, using the processor, the base game to an enhanced base game state in response to the Newprom award. The Newprom award may be configured to add one or more base game play enhancements available to a player only by way of the Newprom award to the base game. In some embodiments, this may alter the base game to the enhanced base game state so that the base game is played with the one or more game play enhancements. The game play enhancements may include a change in a game play, game format, game style or game type of the at least one base game, additional pay lines to the at least one base game, additional winning indicia for the at least one base game, or any combination thereof.

In some embodiments, a method for enhancing game play on a gaming machine may include receiving a Newprom award that is not obtained at the gaming machine. The method may further include altering, using the processor, the base game to an enhanced base game state in response to the Newprom award. The Newprom award may be configured to add one or more base game play enhancements available to a player only by way of the Newprom award to the base game. In some embodiments, this may alter the base game to the enhanced base game state so that the base game is played with the one or more game play enhancements. The game play enhancements may include a change in a game play, game format, game style or game type of the at least one base game, additional pay lines to the at least one base game, additional winning indicia for the at least one base game, or any combination thereof.

The foregoing summary does not encompass the claimed invention in its entirety, nor are the embodiments intended to be limiting. Rather, the embodiments are provided as mere examples.

BRIEF DESCRIPTION OF THE DRAWINGS

FIG. 15 is a diagram of elements used for promotion award issuance.

DETAILED DESCRIPTION

Figure 1:
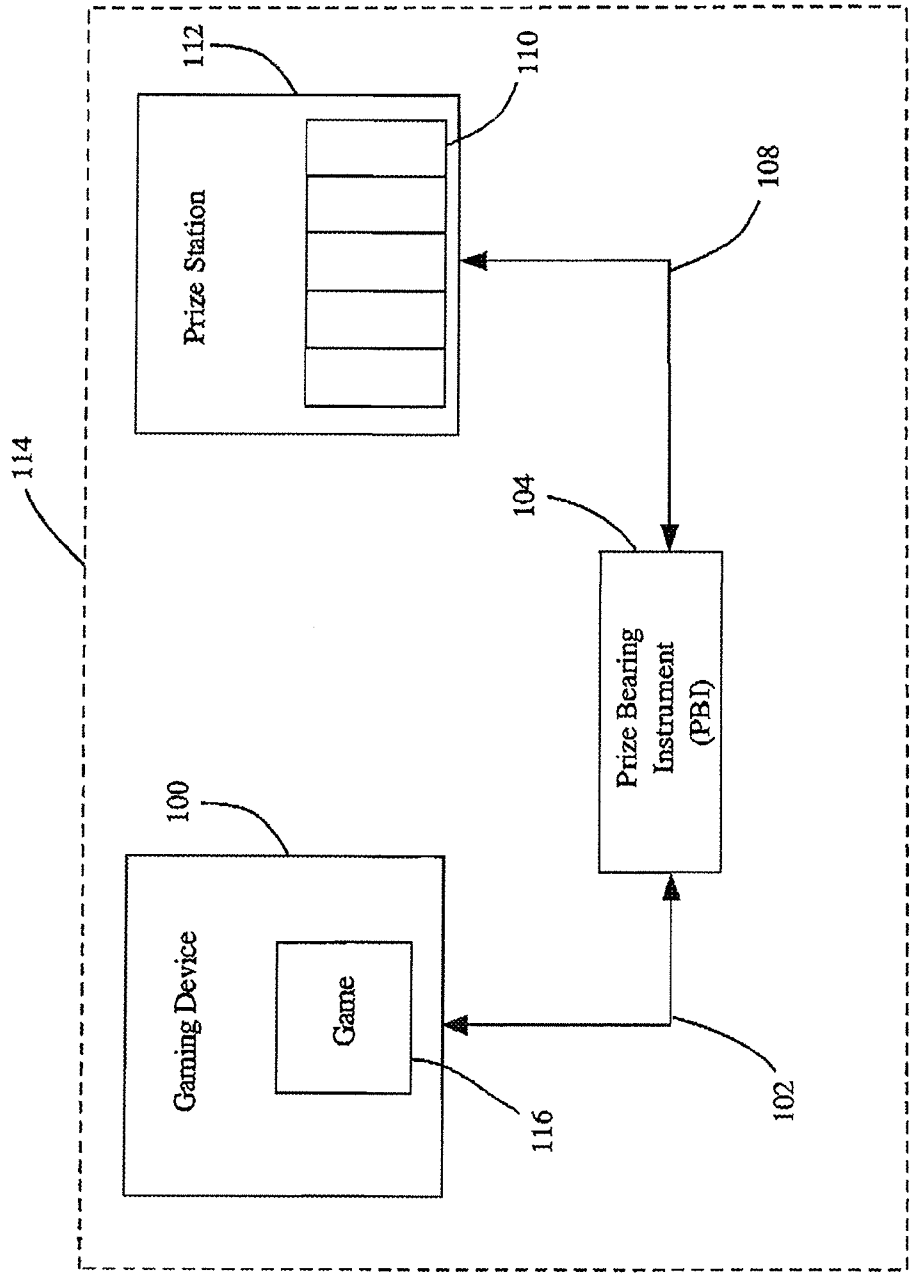
FIG. 1 is a functional block diagram of an example system for maintaining award game states.

Referring to the drawings, for illustrative purposes the disclosure is shown embodied in FIG. 1 through FIG. 23. It will be appreciated that the apparatus may vary as to configuration and as to details of the parts, and that the method may vary as to details and the order of the acts, without departing from the inventive concepts disclosed herein.

The disclosure provides new methods and apparatus usable for the promotion of extended or enhanced game play, directed at targeted games having targeted times and at targeted locations, along with additional criteria. The disclosure provides for a granularity of promotional enticement not previously possible. Using the disclosure allows targeted populations of players to be combined with targeted games, gaming devices, locations, playing times, and other criteria. Coupled with the fine granularity of targeted devices and players (users), the disclosure also provides for much particularized forms of enhanced game play, enhanced game award levels, and enhanced general award levels that were not previously available. To enable this new type of promotional capability in its preferred embodiment, new game state saving methods and apparatus must be introduced. The first type of saved game state is the games award credit state, discussed immediately below.

FIG. 1 shows a block diagram of an example system for maintaining a player's award credit state. System 114 includes a gaming device 100 and a prize station 112. Gaming device 100 comprises a conventional game of chance, such as a slot machine, video poker machine, video lottery device, keno machine, bingo machine. The gaming device 100 may alternatively comprise a live table game of chance, such as a blackjack table or roulette table, where the functions described herein carried out by the gaming device are carried out by a table attendant.

If gaming device 100 is not a live table game, then gaming device 100 further provides a game 116 configured for play by a player. Gaming device 100 would then include typical hardware and software components (not shown), such as a processor, memory, and input/output devices such as a video output and control inputs, and game software, for executing game 116. According to play of the game 116, one or more game results may provide the player with an "award credit". The game results may be provided by a game of chance involving random events or may be provided from a predetermined outcome selected from a fixed pool (e.g., a lottery).

Award credits, unlike game credits which are used for playing the game 100, may be directly redeemed for prizes or awards on prize station 112. Award credits may also be used in a meta-game. Although in the preferred embodiment award credits are not used for additional game play, the disclosure fully encompasses embodiments which do provide for award credits being used to add to game play credits.

A meta-game is defined as using credits, award credits, promotion awards (defined below), or any other transferable result(s) from one or more individual games comprising a plurality of individual game units, towards a game that requires, in order to play, the output results (in terms of credits, award credits, promotional credits, special indicia, etc.) of previously played game or games, and where the meta-game is a different game than any of the games from which output results are being used.

In the simplest case (other than straight prize redemption using award credits) the award credits may comprise meta-game pieces which are collected by the player for use at prize station 112. In this example, the meta-game pieces may be part of a game board or puzzle and when the player has collected a particular subset (i.e., collection or accumulation) of meta-game pieces, the player uses those pieces to "play" prize station 112, where the combination of award credits will entitle the player to a particular prize or class of prizes. In other cases the award credits may entitle the player entry into a more complex meta-game, where the award credits are used in the meta-game in a similar way that currency is used in primary games.

Figure 2:
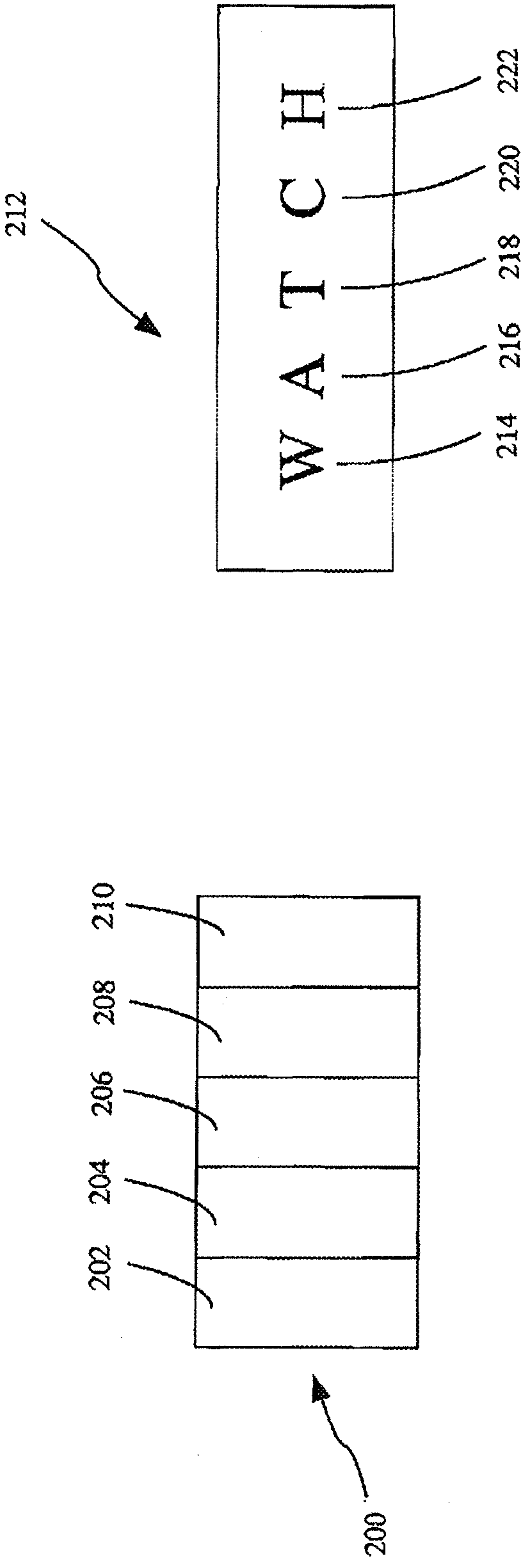
FIG. 2 is a functional block diagram of an example game board suitable for use with one embodiment.

FIG. 2 illustrates a sample game board 200 having spaces for game pieces 202, 204, 206, 208 and 210. The game pieces 202 through 210 may be represented by indicia or representation to a particular theme, such as a popular board game, television show, movie, etc. Game rules may require accumulation of all or part of the game pieces 202 through 210 for different levels of prize awards.

FIG. 2 also illustrates a second sample game board 212 having letter space holders to accommodate letters 214, 216, 218, 220 and 222 corresponding to the word "WATCH." This game allows a player to collect letters (game pieces) from the word "WATCH" during game play of the primary game, normally a slot game. Once the player has collected all the letters, the player may redeem a prize corresponding to "WATCH" from the prize station. Numerous other game board formats and rules suitable for use with the present invention will be readily apparent to one of ordinary skill in the art and with the benefit of the present disclosure.

Referring back to FIG. 1, according to one embodiment, the gaming device 100 is configured to maintain a record of the accumulated award credits (game pieces) associated with the player, including award credits earned during play of the game 116. The player may maintain the player's state of award credits earnings (e.g., award credit game state, or award credit state) even when the player has terminated play of the gaming device 100. In one embodiment, the player's game state is maintained via a prize bearing instrument ("PBI") 104. PBI 104 may comprise any media suitable for associating a player's award credits with the player. Example media include a printed ticket (voucher), a magnetic or smart card, or other information storage medium. As an interface to PBI 104, gaming device 100 provides a PBI reader/writer device (not shown) capable of reading PBI 104 and writing to (or generating) a PBI. PBI 104 will typically contain one or more data records indicating the number of (or collection of) award credits earned by the player. For vouchers, gaming device 100 will include a voucher reader and a voucher printer that is in operable communication with gaming device 100. When the player selects to terminate play, gaming device 100 prints a voucher indicating the number of award credits earned by the player.

Gaming device 100 is also configured to determine the accumulated award credits previously earned by the player, generally by reading PBI 104 as presented by the player and identifying any award credits indicated. The previous award credits may have been earned from the same gaming device 100 or a similar gaming device having the same underlying feature set of gaming device 100.

The award credits previously earned as identified by gaming device 100 are accumulated with further award credits which the player may earn during current play of gaming device 100. The accumulated award credits may be maintained by the player at the termination of play of the gaming device 100 via another PBI 104 which indicates the overall accumulated award credits earned. PBI 104 thus preserves the "award credit game state" or "game state" of the player in terms of award credits upon termination of play on the gaming device. The player may later resume play of the gaming device 100 at the preserved game state by presenting PBI 104 to game device 100 as described above.

In the example "WATCH" game 212 of FIG. 2, the player retains the player's earned letters (investment) so that when the player later continues play either on the same or different game, the player's letters (investment) is retained and restored and the player resumes play from the preserved game state. Although described herein for the purposes of redeeming tangible prizes and service, it will be readily apparent to those skilled in the art that the disclosure is suitable for use with preserving game states (e.g., award credits, game pieces) for use with bonus games, progressive games, investment bonus games, among others.

Continuing with FIG. 1, prize station 112 contains one or more prizes 110. The prizes may be tangible goods (e.g., diamonds, keys to a car, event tickets), services, or monetary awards. Although not required for operation, the prizes are not generally redeemable directly via cash payments by the player to the prize station or the game devices. Rather the prizes are normally redeemable via award credits earned by the player from playing gaming device 100. The redemption process indicated by double-headed arrow 108 is manually initiated by a player, as is the playing process indicated by double-headed arrow 102. Both paths make use of PBI 104. Redemption path 108 is executed by presenting one or more PBIs to prize station 112. Prize station 112 is equipped with a PBI reader/writer device (not shown) for reading PBI 104 and determining the award credits associated with the player from data provided by PBI 104. The prize station then determines the prizes to which the player is entitled according to the award credits earned by the player. For example, prizes may be selected according to the number of award credits earned (e.g., using a hierarchical prize level arrangement) or according to the collection of types of award credits earned (e.g., game pieces on a game board or puzzle) or both. Other prize payout arrangements may also be used.

After the player's selection, the selected prize is awarded to the player. According to one embodiment, the prizes are maintained in vaults having doors secured by latches and windows to thereby allow the player to see the prizes inside the vaults and yet provide a level of security by limiting access to the prize. A button actuator receives the player's selection. In response, the latch is released allowing the player to open the door and retrieve the prize. In another embodiment, an attendant provides the prize to the player in response to the player's selection. Security measures may also be implemented including verification of the PBI via a validation server, which verifies transactions indicated by the PBI against records in a database (not shown). Additionally, if an attendant tenders the prize, the attendant may be required to present a code or electronic key identifying the attendant. This identifying information may then be verified against a validation server to determine whether the attendant has sufficient authority to tender prizes to players.

In another embodiment, the prize station 112 comprises a conventional computer having a display monitor to present the prizes. In this embodiment, a web site may be used to provide an interface to which the player redeems award credits. In yet another embodiment, prize delivery may be made using a conventional courier services or mail service.

Figure 3:
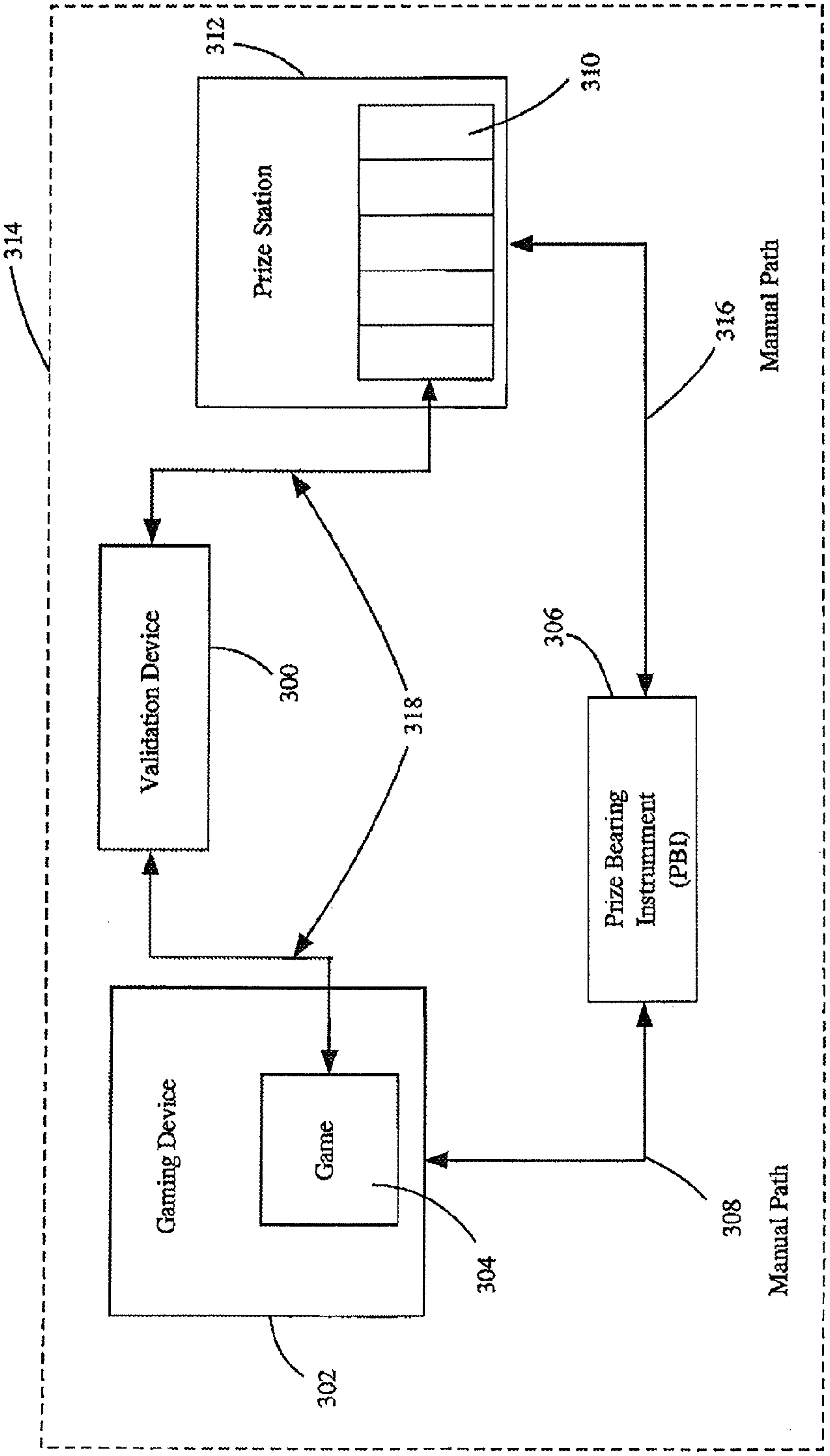
FIG. 3 is a functional block diagram of another example system for maintaining award game states.

Referring now to FIG. 3, another embodiment of a system for maintaining a player's award game state in accordance with one embodiment is shown. System 314, like system 114 described above in conjunction with FIG. 1, comprises a gaming device 302 for playing a game 304 and a prize station 312 comprising one or more prizes 310. System 314 further comprises a validation device 300 which typically comprises a server computer configured with conventional hardware and software components (typically including a database, not shown). Validation device 300 is operatively coupled for communication with gaming device 302 and prize station 312, normally via a network connection, shown as connections 318.

Validation device 300 may function in one of a number of ways. According to one embodiment, validation device 300 may serve to validate award credits which are earned and collected by the player on gaming device 302 and redeemed for prizes at prize station 312. Various validation means known in the art may be used to carry this out, including maintaining transaction records on validation device 300 which corresponds to transaction records identified on the player's PBI 306.

According to another embodiment, the use of validation device 300 eliminates (or reduces) the need for recording the actual award credits onto PBI 306. Rather, validation device 300 may serve to maintain the award credits associated with players in a database (not shown). Under this arrangement, the player is identified with a record in the database, which further identifies the award credits earned by the player. The player may use any means for identifying herself to gaming device 302 or prize station 312, including using a personal identification number ("PIN") or using an identity PBI 306, which instead of bearing the award credits earned by the player provides a unique identifying information to identify the player's corresponding game state (e.g., award credits or game pieces) information. The use of PBI 306 is indicated by double-headed arrows 308 and 316; both show a manual path of use by the bearer of the PBI. In each case the bearer of PBI 306 would insert it into a PBI reader at the target location.

Figure 4:
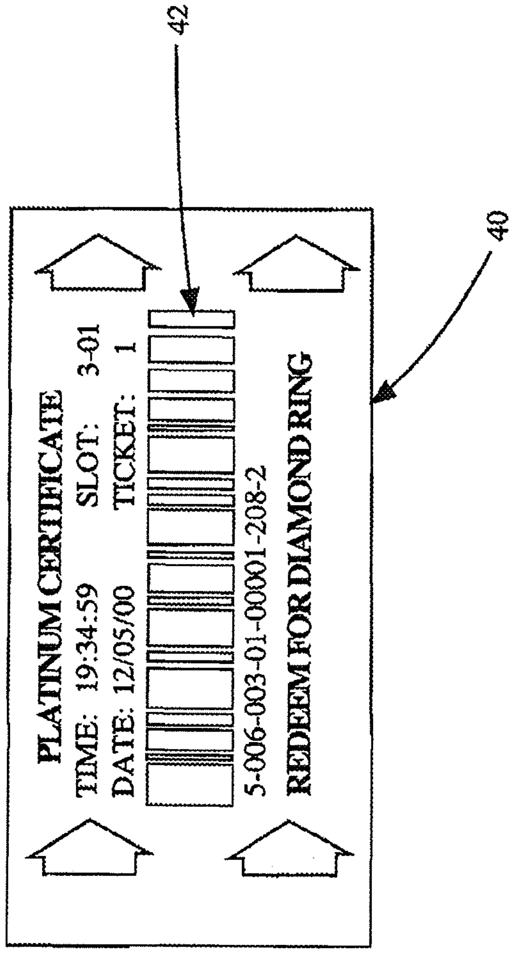
FIG. 4 depicts a sample voucher ticket suitable for use with one embodiment.

FIG. 4 depicts an example ticket voucher 400. Ticket voucher 400 includes a data record in the form of a UPC bar code 402. As described above in conjunction with FIG. 3, this data record may identify the player's award credits or may alternatively identify the player's corresponding record in the validation unit's database.

Figure 5:
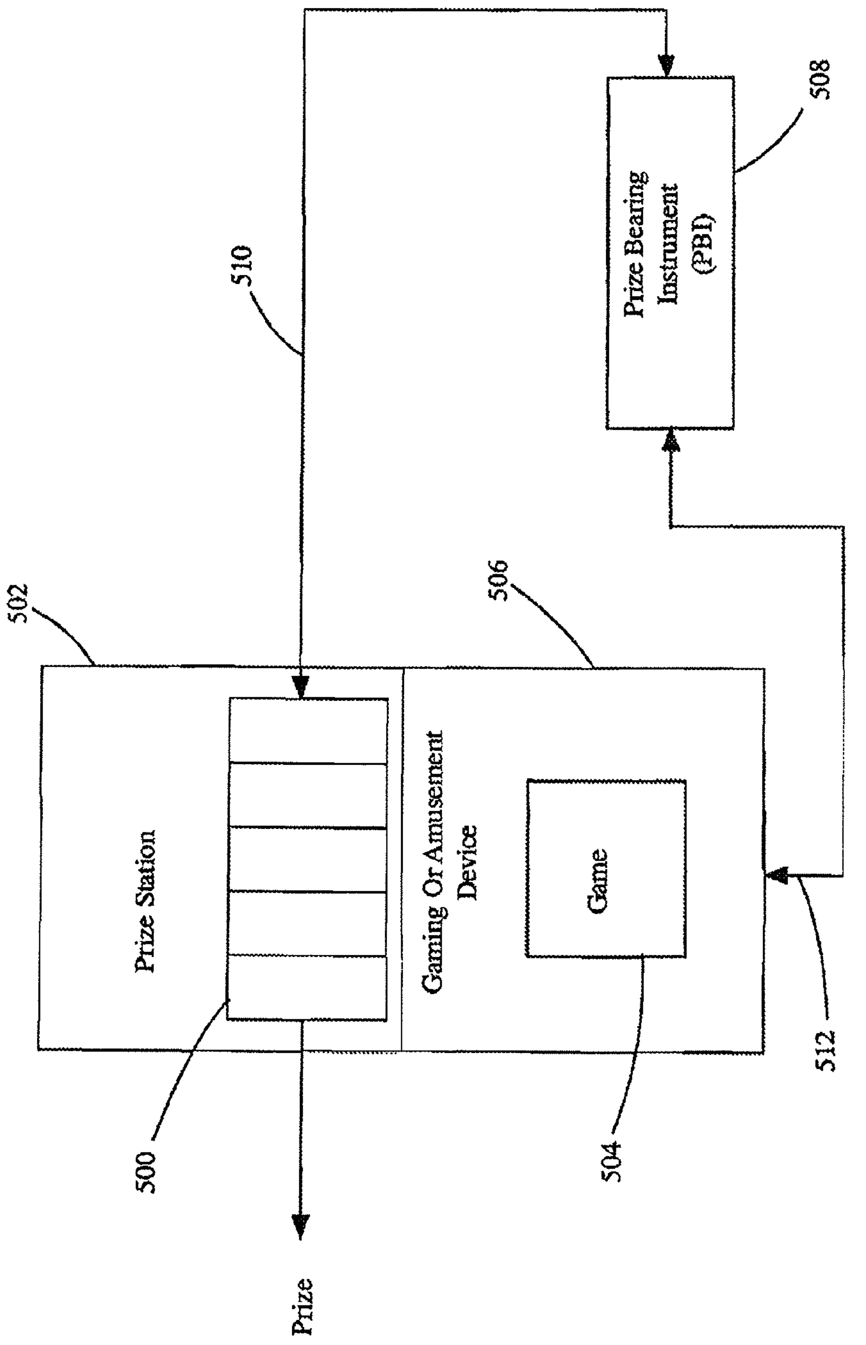
FIG. 5 is a functional block diagram of another example system for maintaining award game states.

FIG. 5 illustrates another example embodiment of a system for maintaining a player's game state in accordance with one embodiment. The system has a gaming device 506 suitable for playing a game 504 and a prize station 502 having one or more prizes 500. Gaming device 506 and prize station 502 are integrated into a single unit.

Gaming device 506 and prize station 502 may further be operatively coupled for communication to allow prize redemption to be made by the player via the gaming device. In this embodiment, the gaming device may include a monitor or other display device (not shown) for displaying game play as well as prize selection on a single display unit. The gaming device may further be coupled to or configured to be coupled to a network for connection to the global information network (Internet). Under this arrangement, a web-based scheme may be used to provide prize selection and to select delivery method directly on the gaming device. In this environment, the player's award credits may be used for shopping online. For example, a prize selection may allow a player to purchase a predetermined amount of goods or services from pre-selected online merchants. PBI 508 may also be used as described above in FIG. 1 and FIG. 3. Path 512 shows manual use of PBI 508 with the player inserting/withdrawing PBI 508 from gaming device 506. Path 510 may be either a manual path, where the player inserts PBI 508 into a reader associated with prize station 502, or may include an electronic connection between gaming device 506 and prize station 502, where PBI 508 may be issued after completing a transaction at both gaming device 506 and prize station 502.

Figure 6:
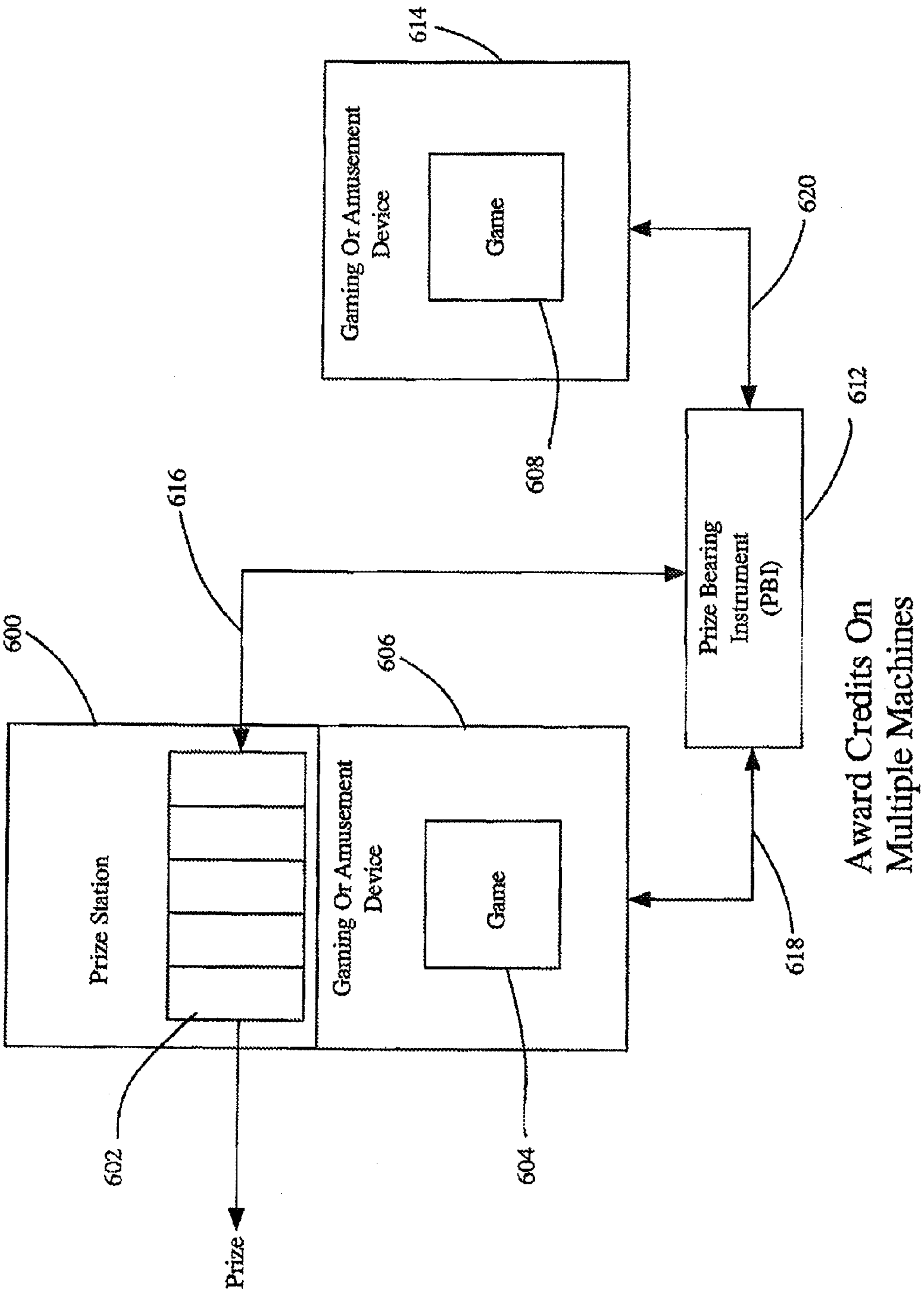
FIG. 6 is a functional block diagram of another example system for maintaining award game states.

Referring next to FIG. 6, shown is another example embodiment for maintaining a player's award game state. There is a game device 606 having a game 604 for play and another game device 614 having a game 608 for play. The game device 606 is integrated with a prize station 600 as described above in conjunction with FIG. 5.

The award credits earned by a player on game device 606 may be maintained and later presented and accumulated with additional award credits on game device 606 or game device 614, normally via PBI 612, although as noted above a validation unit may be used to perform this game state maintenance function on the "back-end." Likewise, award credits earned by a player on game device 606 may be maintained via PBI 612 for presentation and accumulation of further award credits on game device 614 or game device 606. PBI 612 may be presented to the prize station 600 for prizes shown generally as 602. Paths 616, 618, and 620 show the different uses to which PBI 612 may be used in this embodiment. Paths 618 and 620 are award credit creation/gathering by manually using (or receiving) PBI 612 from gaming devices 606 and/or 614. Path 616 indicates the manual use or retrieval of PBI 612 after using prize station 600.

Figure 7:
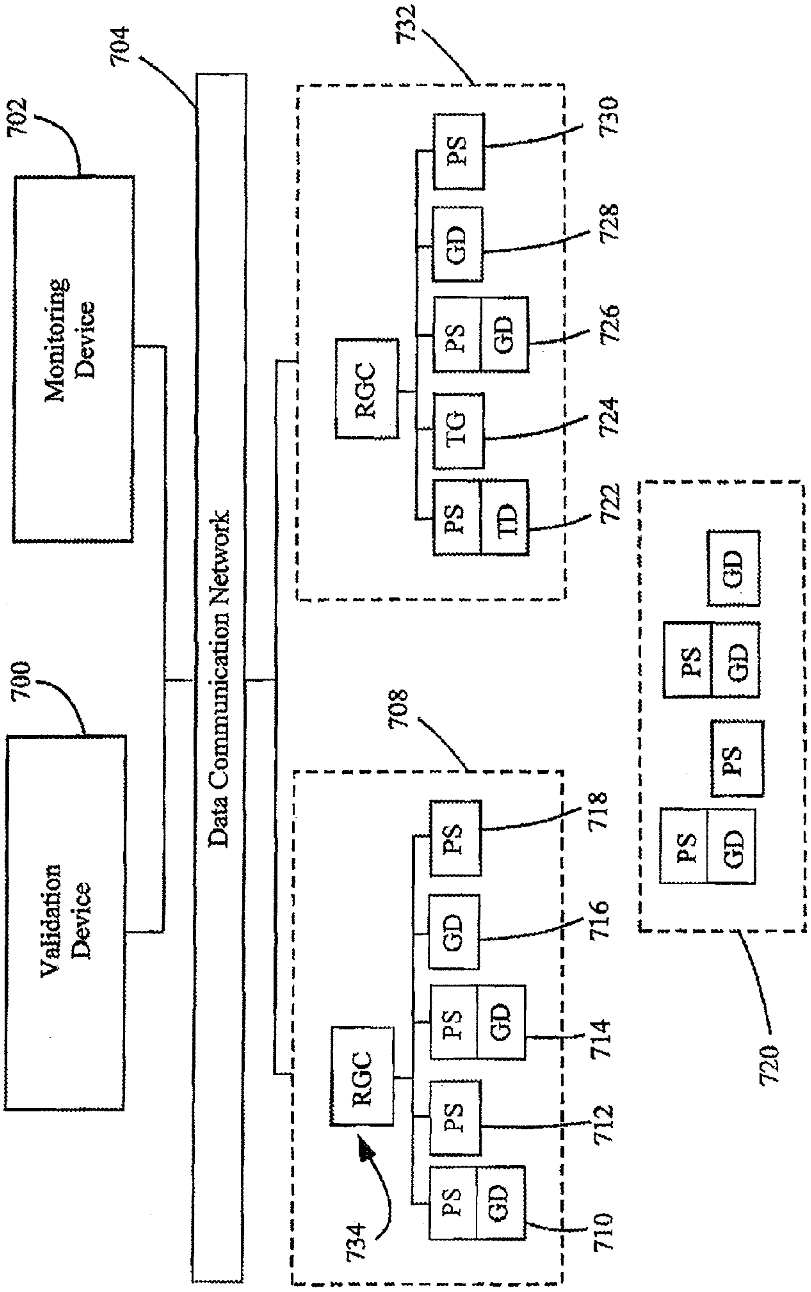
FIG. 7 is a functional block diagram of another example system for maintaining award game states.

Turning now to FIG. 7, there is shown another example award state maintenance system which comprises a plurality of individual systems grouped as 708, 720, and 732. FIG. 7 illustrates that a wide variety of systems and subsystems may be utilized with one embodiment. Subsystems include those that are both connected and unconnected.

Systems 708 and 732 are each operatively coupled for communication to a validation device 700 and a monitoring device 702 via a data communications network 704. System 708 comprises a plurality of game devices and prize stations each coupled to a conventional remote game controller ("RGC") 734. RGC 734 is coupled to communication network 704 for communication with the validation and monitoring units. System 708 includes individual game device 716 and prize stations 712 and 718. System 708 further includes integrated game devices and prize stations 710 and 714. Award credits earned in any of the gaming devices may be maintained according to one embodiment, including a PBI, validation unit 700, or via a combination of the PBI and the validation unit 700 as described above. The disclosure encompasses configurations that allow system 708 to issue award credits that may or may not be used on system 732 or on system 720; any subsystem may be configured to accept or reject award credits from other subsystems, depending on the needs of the particular installation.

System 732, like system 708, comprises a plurality of game devices and prize stations each coupled to an RGC, which is coupled to communication network 704. The game devices of system 732 include table games ("TG") 722 and 724 as well as conventional gaming devices 726 with integrated prize station) and 728 and a non-integrated prize station 730. Table games 722 and 724 are maintained by an attendant or dealer for the particular table game (e.g., blackjack, roulette). Each table game is also equipped with a PBI reader/writer (not shown) to enable a player of the table game to present her PBI and establish the player's existing or previously earned award credits. Certain game results (such as consecutive blackjacks) may result in further award credits to be earned by the player during play of the table game. At the completion of play the PBI reader/writer may be activated to generate a PBI to give to the player after play is completed. As noted above, the award credits may alternatively be managed by validation device 700 in conjunction with individual PBIs, or without the need for a PBI where a player has a PIN number to identify the player. Table game 722 differs from table game 724 in that table game 722 further has in combination a prize station, where a player may redeem award credits for prizes.

System 720 also comprises a plurality of gaming devices and prize stations, but unlike systems 708 and 732 this system is not coupled to communication network 704. Each gaming device will use PBIs rather than validation device 700 and monitoring device 702. As discussed earlier, the overall system may be configured to allow or disallow PBIs generated from subsystem 708 or 732 to be used in the machines comprising subsystem 720 and vice versa.

Figure 8:
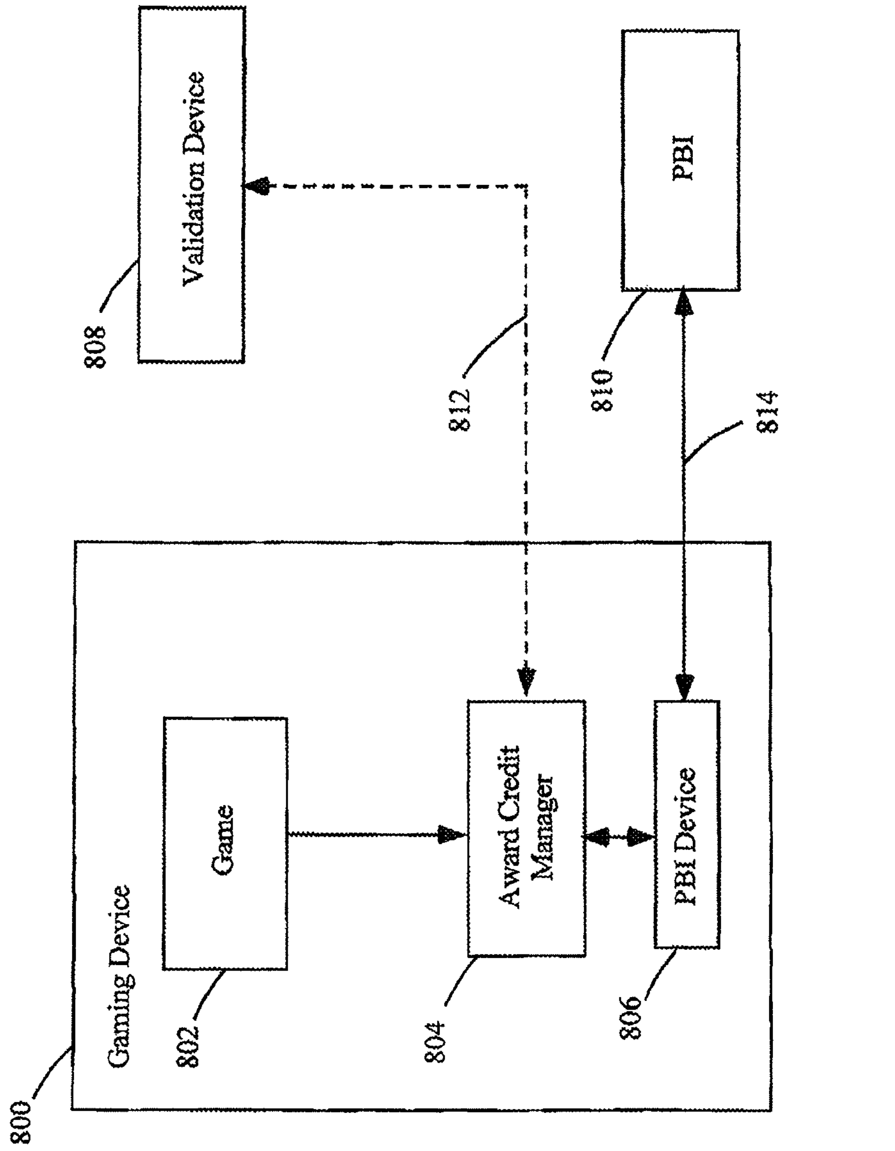
FIG. 8 is functional block diagram showing an example gaming device suitable for use with one embodiment.

Referring now to FIG. 8, a gaming device is shown in additional detail. Gaming device 800 comprises a game 802 operatively coupled with an award credit manager 804, which is also operatively coupled with a PBI input/output device 806. The PBI input/output device 806 is configured to read, write, generate, transmit, and receive information about PBI 810 as needed. Path 814 shows a manual usage path for PBI 810; the player must manually insert the PBI into the PBI reader. If PBI 810 comprises a printed ticket (voucher), the PBI input/output device 806 comprises a voucher reader for reading vouchers and indicia printed thereon, such as Interleaved 2 of 5" bar codes. The PBI input/output device 806 would further include a voucher printer for generating vouchers when the player terminates play on gaming device 800.

The award credit manager 804 carries out the operation of managing a player's award credits during play. If a player presents a PBI 810 prior to playing, the previously earned award credits are identified either directly from the PBI 810 and/or from validation device 808 which communicates with the gaming device 800 over an electronic communications path 812. During play of the game 802, the player may earn additional award credits based on winning game events. Such award credits are accumulated by the award credit manager 804 in conjunction with the previously earned award credits, if any. Upon termination of play of the gaming device by the player, another PBI 810 may be issued to the player which contains data associating the cumulative award credits earned by the player.

Figure 9:
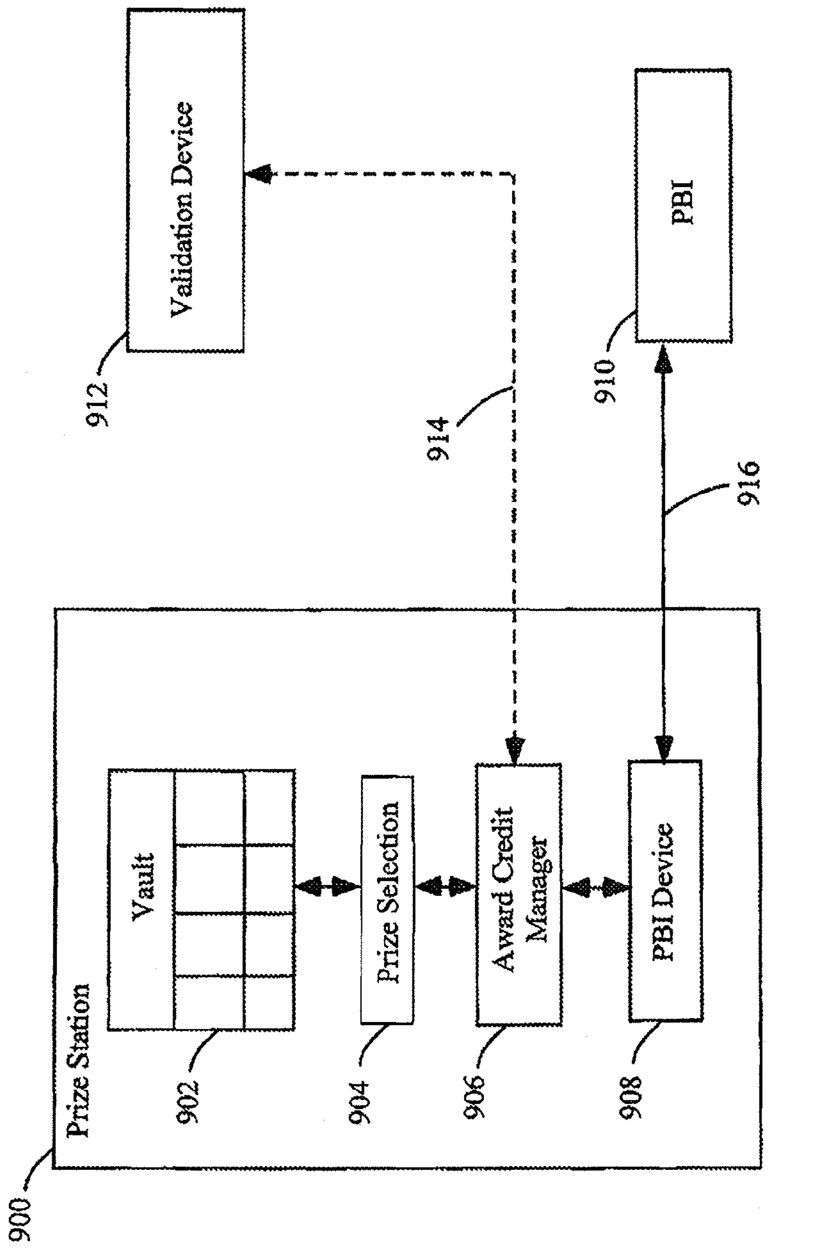
FIG. 9 is a functional block diagram showing an example prize station suitable for use with one embodiment.

FIG. 9 shows a prize station in more detail. Prize station 900 comprises a PBI input/output device 908 operatively coupled to an award credit manager 906, a prize selection module 904 coupled to the award credit manager 906, and a plurality of prizes maintained in vault 902, the vault operatively coupled for communication with the prize selection module 904.

When a player presents one or more PBIs to prize station 900, shown as PBI 910 and manual insertion path 916, the PBI input/output device 908 reads the award credits associated with the player. Award credit manager 906 determines the total award credits' value, either directly from PBI 910 and/or from validation device 912. Validation device 912 is operably connected to prize station 900 via electronic communications path 914. Prize selection unit 904 offers to the player one or more prize selections based on the player's total award credits. The player may select a prize selection or may cancel prize redemption. If a player selects a prize, the prize is awarded from vault 902. If the prize selection does not exhaust the player's total award credits, another prize selection may be offered to the player, if the remaining credits are sufficient to support a prize selection from the vault 902. If the remaining award credits are not sufficient to support a prize selection, the remaining award credits are maintained and associated with the player, normally by dispensing another PBI 910.

Where an attendant manages a prize booth to carry out the functions of the prize station in accordance with one embodiment, the player presents one or more PBIs 910 to a PBI input/output device 908 associated with the prize booth to ascertain the award credits associated with the player. The player's award credits are indicated to the attendant, normally via a conventional video display device (not shown). The attendant then notifies the player of the prizes (and/or prize levels) to which the player is entitled according to the player's earned award credits. This can be carried out manually via a catalog (or a prize display booth) or automatically via the display device. In response, the player makes a prize selection, and the attendant either manually tenders the prize to the player or provides automatic (via vending device) or courier delivery (e.g., mail, parcel service) to the player.

Figure 10:
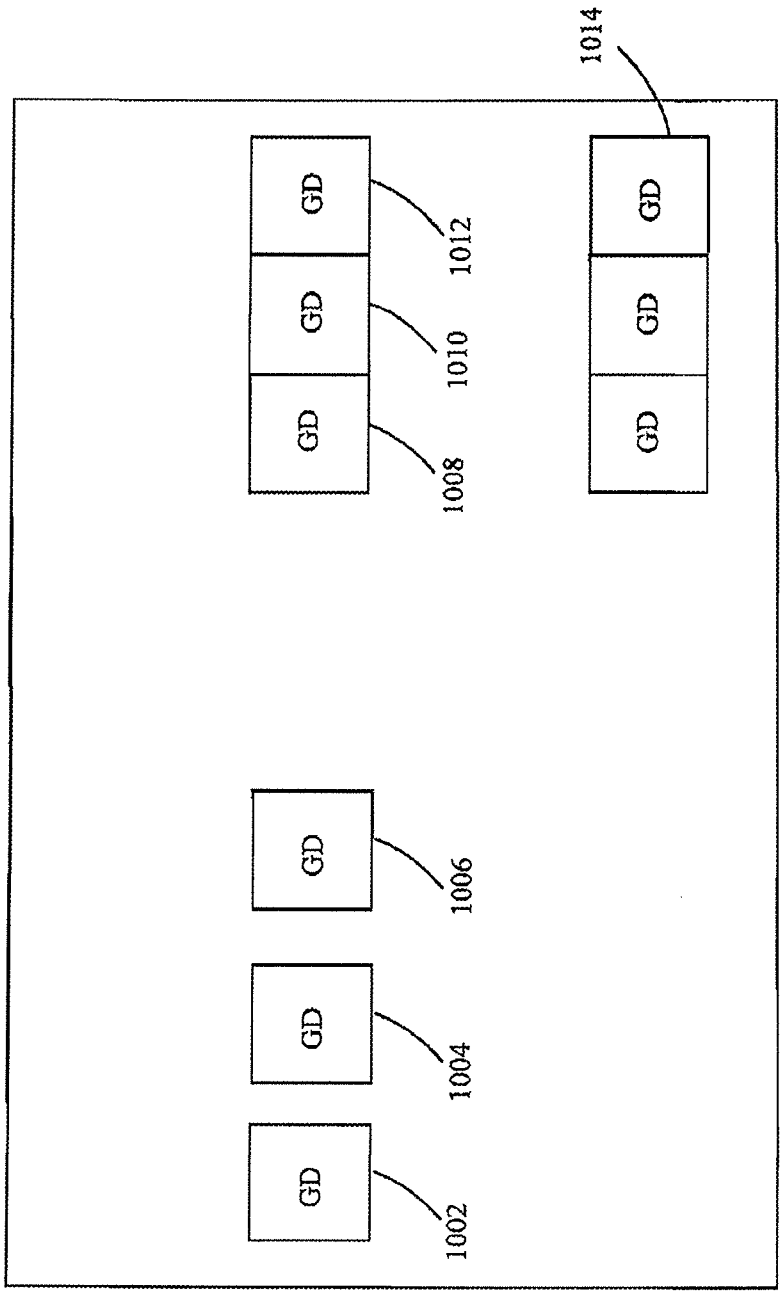
FIG. 10 is a functional block diagram depicting meta-games suitable for use with one embodiment.

FIG. 10 illustrates two additional meta-game systems which may be implemented using the game state maintenance system in one embodiment. FIG. 10 includes a prize station 1000 and a plurality of gaming device indicators illustrated as gaming device indicators 1002, 1004, and 1006. Each gaming device indicator corresponds to a gaming device on the game floor; there may be as many gaming device indicators as there are individual games in actual implementations or they may be grouped for convenience. Under this arrangement a particular prize awarded by the prize station 1000 may require an award credit from each of the gaming devices indicated by 1002 through 1006 or a predetermined subset, such as three award credits where at least two of three must come from different gaming devices. Various other award requirements may also be used and will readily come to mind for a person of ordinary skill in the art and with the benefit of the present disclosure.

Another example of a meta-game involves banks of gaming devices. Bank 1 is shown having individual gaming device indicators 1008, 1010, and 1012. Bank "n" is referenced generally as 1014, and is understood to further comprise individual gaming device indicators not individually labeled. There may be any number of banks between bank 1 and bank "n". Prize station 1000 may require an award credit from each bank of gaming devices (corresponding to the gaming device indicators) in order to receive a particular prize. Each bank may be configured as the same game (e.g., blackjack), the same device type (e.g., slot machine), the same family of game (e.g., games manufactured by Sierra Design Group™, or other arrangement).

Figure 11:
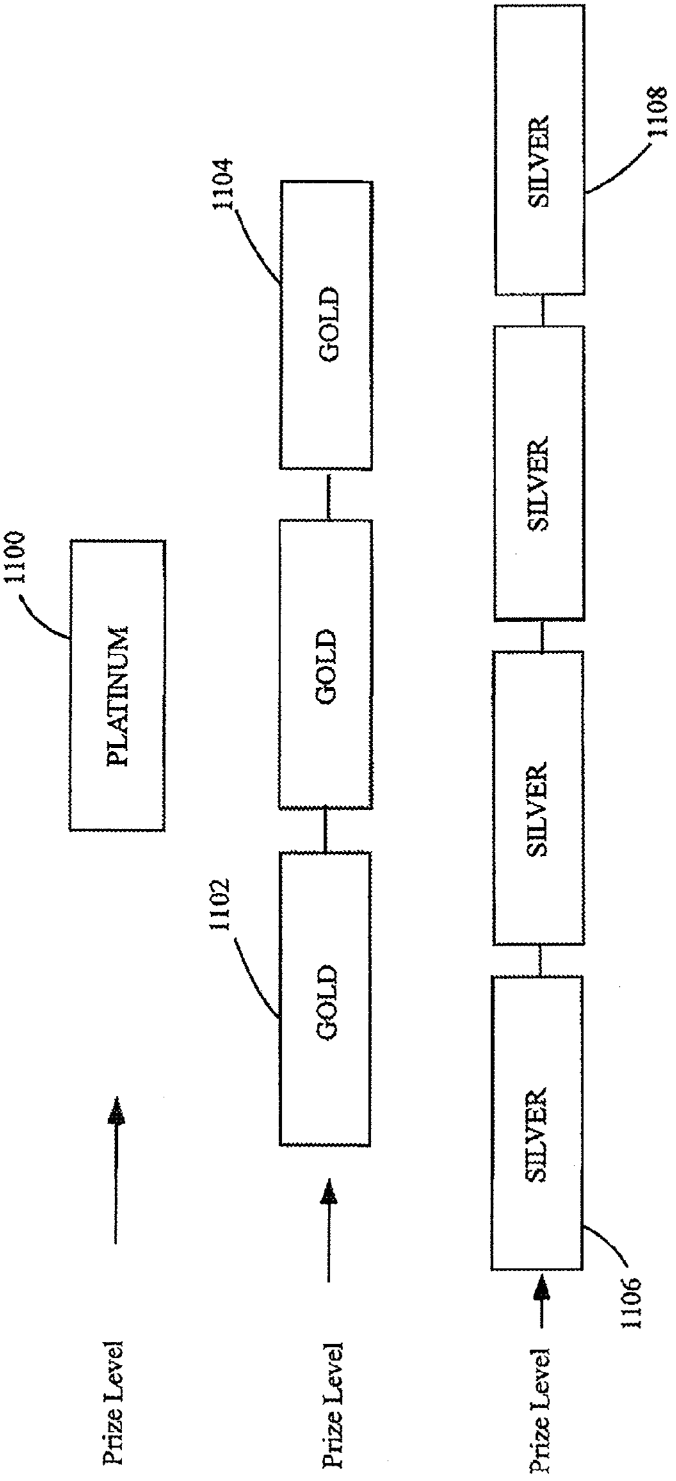
FIG. 11 is functional block diagram showing prize organization suitable for use with one embodiment.

FIG. 11 illustrates a sample hierarchical prize level arrangement suitable for use with one embodiment. The sample arrangement includes prize levels comprising a silver level (1106 through 1108), a gold level (1102 through 1104), and a platinum level 1100. One or more prizes may be associated with each level. For example, bracelet prizes may be available at the silver level (1106 through 1108), watches may be available at the gold level (1102 through 1104), and diamond jewelry may be available at the platinum level (1100). According to this arrangement, the gaming device may provide silver level award during play. The player may decide to redeem the silver award for one of the bracelet prizes, or the player may elect to accumulate additional silver level awards by playing the same or another gaming device.

The prize values in this example are arranged hierarchically, where two of the prizes at one layer are worth one of the prizes at the layer above. Two silvers awards may be used to redeem either two silver prizes or one gold prize. Similarly, the player may accumulate four silver awards and use them to redeem one platinum prize, two gold prizes, four silver prizes, or one gold and two silver prizes. A player retains any unused (unredeemed) credits during prize redemption. Thus, if a player has accumulated four silver awards, the player may decide to redeem a gold award (at the cost of two silver awards), and retain two remaining silver awards for later use or accumulation.

Having the ability to save award credit state creates the need and desire to save other states associated with a gaming device. A player will be particularly interested in saving the game state of a game that involves the accumulation of play points or play state, where the game state is not tied to award credits (or perhaps not yet tied in to award credits but could be).

Generally, game states other than award credit states fall into one of two categories. The first is saving "partial" credit state, that is, saving state when working towards an award or credit on an investment bonus type game, where the game's state is derived from a game of chance or drawn from a fixed-pool. The second is saving any other game state that effects the state of the game as it appears to a player if they leave and return later, typically a skill game having associated points displayed on a screen, but no other result (i.e., they cannot be converted into game points, award credits, etc.). Usually the player has reached a certain level or point value and doesn't want to have to start over.

Figure 12:
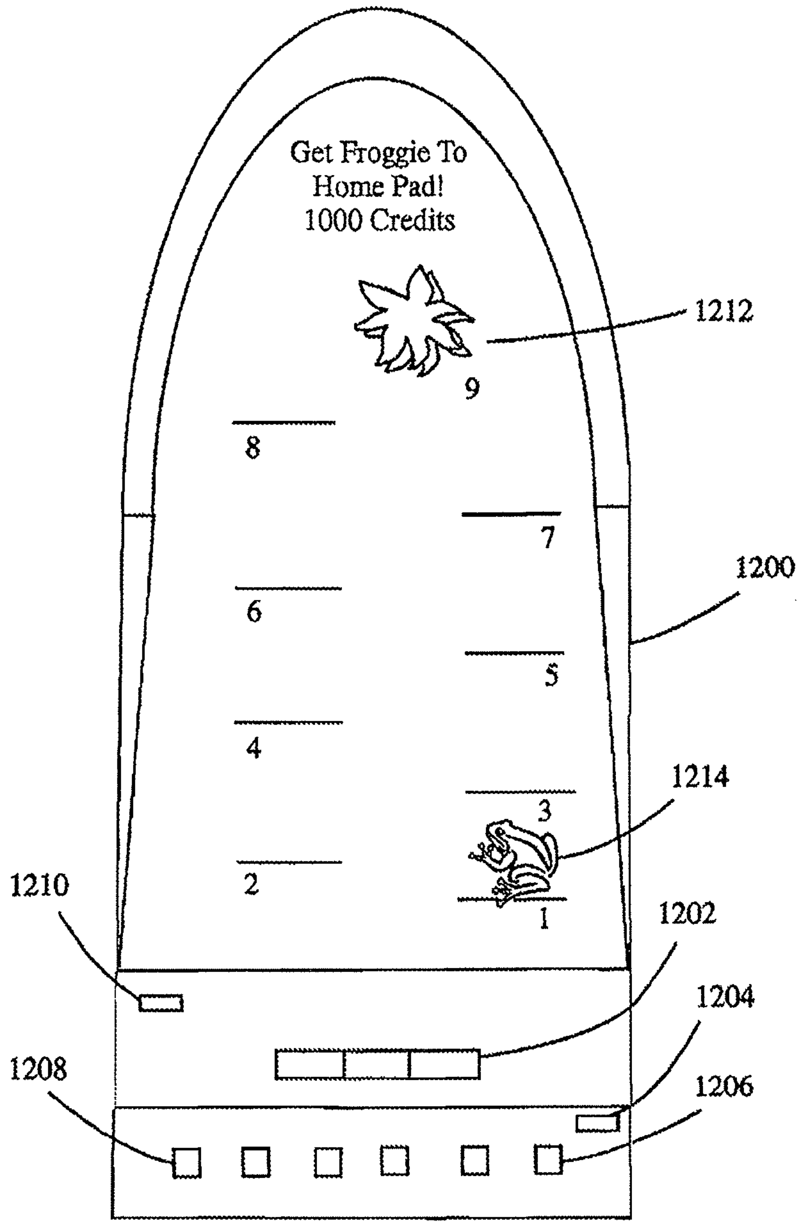
FIG. 12 is a functional block diagram depicting a game state saving game suitable for use with one embodiment.

An example of the first type is shown in FIG. 12. This is a state saving game associated with games based on chance (or fixed-pools) and working towards an award state. Typically the goal, if reached, is playing credits or award credits. Gaming device 1200 has a standard primary game with indicia windows shown as 1202. The primary game may be any of the well-known reel games, poker games, keno, bingo, fixed-pool games, etc. There is a panel of player buttons, shown between buttons 1206 and 1208, used for the primary game. Any layout and interface may be used, from a fixed number of physical buttons to a dynamic layout of touchscreen buttons. Also included are an output slot 1204 and an input slot 1210. Input slot 1210 accepts ID cards, ID vouchers, smart cards, game state vouchers, or any other means used to present gaming device 1200 with credits, states, or ID. If presented with ID, gaming device 1200 must be in operable communication with a back-end database (not shown), typically over a LAN (not shown). The communication means is used to retrieve data associated with the presented ID.

Voucher IDs are intended to be used by people who may be at a casino for more than a brief time, but who do not want to be entered as "players" in the casino's database (typically used by casinos for player tracking purposes and by players to be awarded player tracking points). This may include people who want to play a series of games over an evening or a week, want the convenience of having some gaming data kept on a back-end database, but do not want to give the casino their personal data. The player may choose to use a voucher ID, which is simply any media on which a unique identifier is recorded (typically an alphanumeric sequence). This may include a card with a magnetic strip, smart card, bar-coded voucher, optical disk, infrared ("IR") or low power radio ("RF") devices, or any other form of readable media that can easily be carried by a person. Gaming device data, discussed below, can now be associated with the "voucher ID" rather than a traditional player's card. Typically voucher IDs would be given limited life spans, specified by the holder or establishment.

Like traditional player cards, the player using a voucher ID may be awarded "points" according to conventional methods used for calculating player tracking incentives or awards. Later, the player may redeem the points by presenting his/her voucher ID at redemption sites established by the casino.

Redemption sites could include, but are not limited to, restaurants, bars, hotels, or customer counters.

Returning now to FIG. 12, when playing the primary game there will be game states, indicia, or other aspects of the primary game that will trigger the secondary game. In this example, the secondary game is the "Froggie" game. Each time the secondary "Froggie" game is invoked by the primary game, frog 1214 will advance up one step. The secondary game starts at step 1 (the steps are labeled). With each invocation of the "Froggie" game, frog 1214 advances one step. After 7 invocations frog 1214 will be sitting on step 8. With one more trigger of the secondary game, the player will get the frog to its home pad 1212 (step 9) and will be awarded 1000 game credits. Alternatively, the number of steps the frog advances on each secondary game invocation can be partially determined by the indicia shown on the primary game, allowing for more than one "hop" per invocation. When the frog reaches its home pad 1212, the game may present the player with the option of award credits instead of play credits.

The player has the option of saving the state of the game at the start of each primary game play. In this example, the state saved would be the state of the secondary game, specifically the frog's current step location. If the player plays "Froggie" enough to advance frog 1214 to step 5, the player may touch button 1206, the "save state" button, and receive a print-out in the form of a voucher from output slot 1204. Immediately after saving the game state to a voucher, the game resets itself to the base state, with frog 1214 back on step 1. The player may now leave the game for a while and come back, inserting the previously generated voucher into slot 1210. The game will set itself to the state saved, in this case placing frog 1214 on step 5. The game is now ready to be played.

Typically the game state just recovered will be available for a fixed length of time, perhaps 3 minutes. The game must be played within that allotted time or the game reverts to its start state and the game state voucher value is lost. If the player inserts the game state voucher and decides not to play the game, the voucher can always be recovered by pressing the "save state" button before the allotted time is up. Although discussed in terms of vouchers, any read/write media may be used in addition to having all the game state data stored in a back-end database, accessed by an ID card, PIN, ID voucher, etc. All such methods of saving game state are fully contemplated by this disclosure.

The advantages of saving game state are increased interest in investment bonus games by the players. With the ability to save their state, players who must leave without having reached the winning secondary game state have a much higher incentive to return and continue playing.

Figure 13:
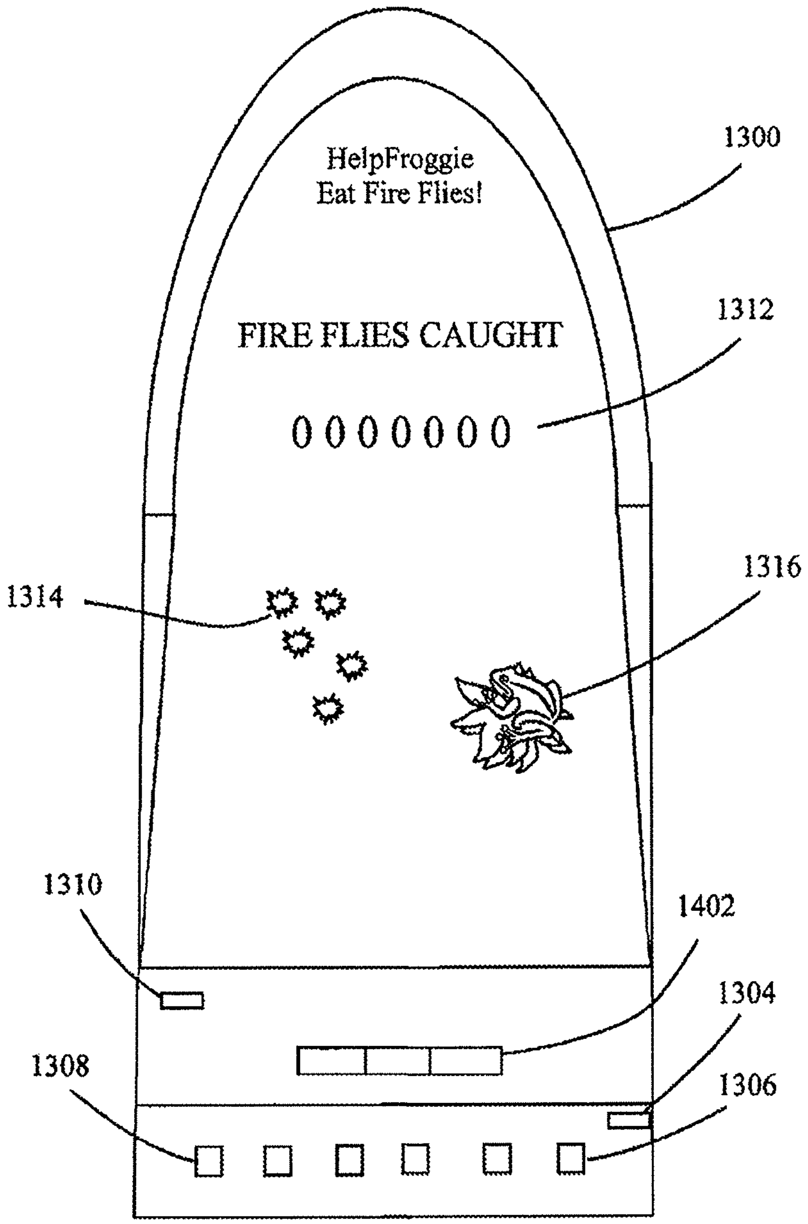
FIG. 13 is a functional block diagram depicting another game state saving game suitable for use with one embodiment.

In addition to saving game state associated with awards, game state may be saved simply to keep a score on a non-award game or skill game. An example of this type of game state is shown in FIG. 13. In gaming device 1300 there is a primary game, indicated with indicia windows 1302. The primary game may be any game of chance or a fixed-pool game, including but not limited to poker, keno, reel-games, etc. Buttons shown between 1306 and 1308 are used to play the primary game in its known manner. Also included is input slot 1310 for reading any convenient input form that may be used to record game state. This includes but is not limited to vouchers, magnetic strip cards, smart cards, player IDs, ID vouchers, IR or RF devices, etc. Output slot 1304 is used to give any form of game state saving media to the player on request, typically some form of voucher or magnetic media. Button 1306 is used for secondary game play; button 1308 is a "save state" button that directs the gaming device to save the current state of the game. All this is shown for illustrative purposes only and can take a plethora of functionally equivalent forms—including configurations with only one, or primary, game.

In this case, when the secondary "Froggie" game is triggered or invoked from the primary game, the player can play the game for skill points. Frog 1316 has a tongue (not shown) that can be extended by pressing button 1306. A plurality of "fireflies" shown as 1314 is flying near frog 1316. A player presses button 1308 when a firefly is in line and near the frog's mouth, getting points thereby. The player accumulates points that are recorded on the screen at 1312.

When the player needs to leave the machine for a time, the player has the option of pressing "save state" button 1306 and saving the all game state of the machine that can be saved; in this case, the players score on the secondary game. The player will be issued a bearer record from output slot 1304 on which is recorded the game state. When the player returns later, the player inserts the readable media into read slot 1310 and the game will reset to the saved state.

In a preferred embodiment, the saved game state will also have an expiration date associated with it. The idea is to encourage a player to maximize their skill point score within a specified period of time (thereby encourage game use in general during the same period). The expiration time picked would depend on the game type, the player's average stay, as well as other factors, but would typically be in hours or days.

The saving of game states discussed above includes award states, "partial" award states (secondary or bonus game state, before award points or prizes have been awarded) and skill game states. Also included is the fact that any game state that is allowed to be saveable by a player may be saved. This determination may be made by the gaming device itself, a back-end server with a database for networked gaming devices, or by parameters set by the operators or other accountable people. The examples given above are illustrative, showing preferred embodiments. They are not exhaustive; the inventive concept disclosed herein fully encompasses any saveable game states.

Game state may be saved in an instrument similar to that of award credits, or bar codes on a voucher, and the like. The descriptions already given above for types of prize bearing instruments (PBIs) and devices that read, write, and use them apply equally for game state instruments (GSIs). The same is also true of the system architectures described for use with PBIs—all the descriptions hold equally true for use with GSIs. Whereas the information contained on a PBI is related to prize redemption, the information on a GSI is to save game state.

If both award credits and game state saving games are used in the same establishment or casino, the preferred embodiment is to combine the two. The amount of information that needs to be stored for both PBIs and GSIs is readily accommodated on any of the instruments described for the PBIs, and may readily be stored in the same database records with additional fields. In this preferred embodiment, a single bearer instrument would contain data for both award credit saving and game state saving, allowing users to carry a single instrument for both uses. It would look essentially the same as the example of FIG. 4, but perhaps with two bar code strips, one over the other, with the PBI and GSI information.

In addition to carrying information on saved game state for one gaming device, it is fully envisioned that this disclosure will encompass the saving of game states for multiple games on a single bearer instrument. If the game state is being saved in a back-end database, this is the straightforward association of one player ID or voucher ID with multiple game state records, where the game state records include fields identifying the gaming device to which the saved state applies. For bearer instruments such as vouchers, multi-game, multi-state vouchers will be issued. These will be supported by readers that will read and understand (decode) the multi-game, multi-state instruments. And as discussed above, although vouchers are being used as an example of bearer instruments, any form of read/write media suitable for use as a bearer instrument is within the scope of the disclosure.

The ability to keep game state for the player as described above helps enable some preferred embodiments (not all) for another inventive concept to be used in gaming, the new promotion (Newprom) award system or Newprom system. Newprom awards, credits, and/or related game state may be recorded in all the ways described for award credits (i.e., smart cards, vouchers with bar codes, databases, and the like.).

As discussed above, saved game state (including award credits, bonus game states, and other game states) are received as a result of game play and allow a player to both save game state on a gaming device and to redeem award credits at prize stations. Newprom awards have been created to be used in ways beyond the scope of award credits and game state savings, ultimately adding to a player's incentive to play a game or visit an establishment. A primary difference between Newprom awards and award credits or game state savings is that in the preferred embodiment, Newprom awards are given to players based on non-gaming events and situations, meta-gaming events, as well as gaming events, and can be used (depending on the specific Newprom award) for both enhanced gaming and enhanced award distribution.

Figure 14:
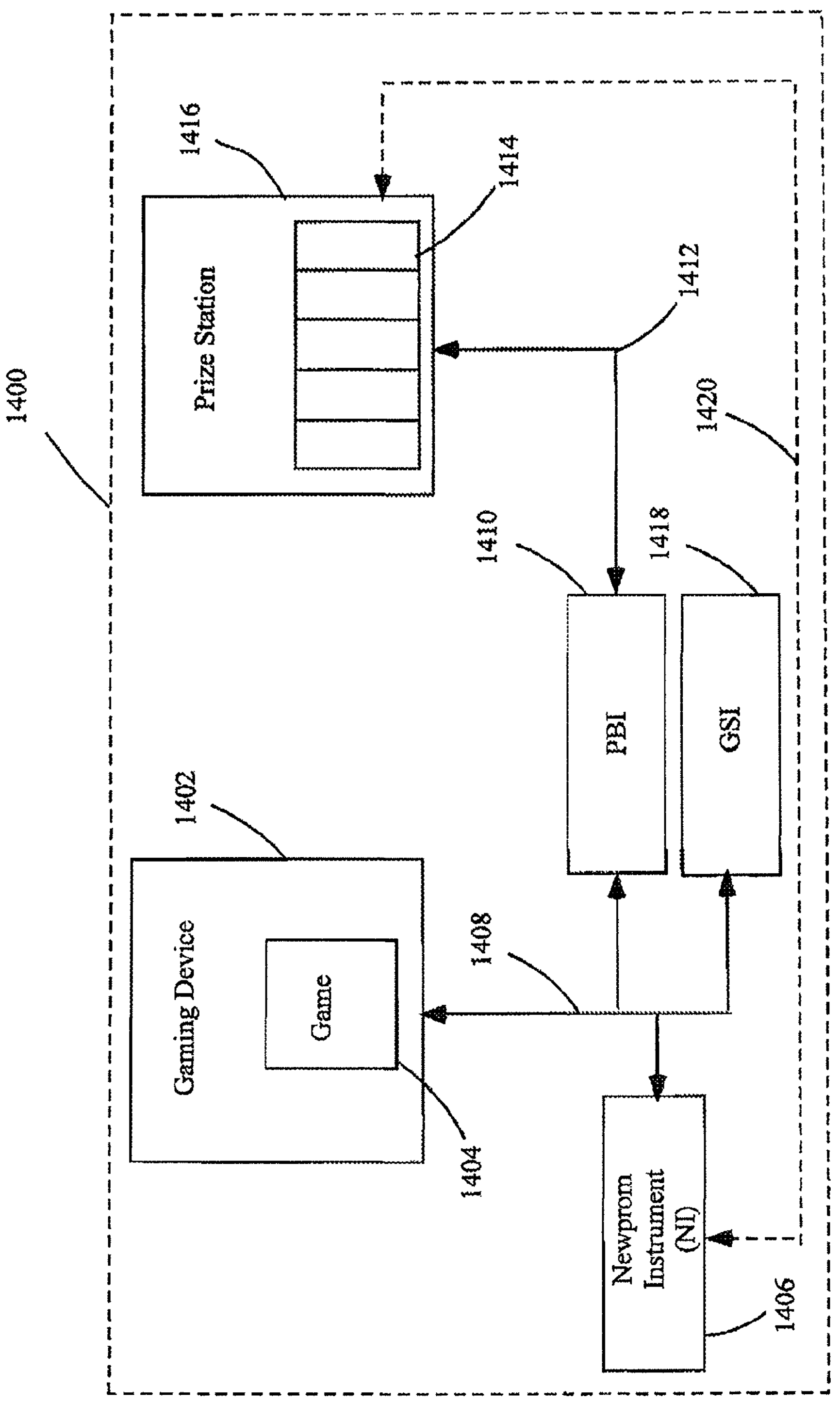
FIG. 14 is a functional block diagram showing an example system with multiple instruments suitable for use with one embodiment.

Referring to FIG. 14, the preferred embodiment allows players to use Newprom awards (Newprom instrument, or NI, 1406) in gaming device 1402 containing game 1404, and in some embodiments in prize station 1416 containing prizes 1414 (shown as connection 1420). Typical Newprom awards are issued to entice players to use a game, such as game 1404, before the player can "cash-in" by using a prize station. However, Newprom awards are configurable to be used in prize station 1416 as well. The Newprom awards used with prize stations have typically been configured to be used in conjunction with a winning ticket or credits from a gaming device, thus still requiring game play before being used at a prize station; the Newprom award then acts as a "prize enhancer." Additionally, Newprom awards may be issued as a result of game play, in which case they may be configured for direct use in a prize station.

FIG. 14 shows a gaming system which uses Newprom awards (NI 1406) as well as award credits (PBI 1410) and game saving instruments (GSI 1418). System 1400 has gaming device 1402 which incorporates game 1404. Also included is prize station 1416 which has a plurality of prizes or prize representations 1414. PBIs 1410 may be used in the manner described above, shown as paths 1408 and 1412. GSIs 1418 may be used with gaming device 1402 as described above, indicated with path 1408. In addition, a new instrument based on Newprom awards is added. NI 1406 may be inserted into the same reader as PBI 1410 or GSI 1418. What was the PBI input/output device described above is now a combined PBI/GSI/NI input/output device.

Newprom awards may be awarded to players in a wide variety of ways and can be structured in any way that suits the needs of the establishment issuing the credits. Some examples are discussed below, but it is to be understood that these are for illustrative purposes only and not an exhaustive list.

Newprom awards may take almost any form an imaginative promoter may wish to use, but may be based on certain specified underlying elements. Typical elements that will be used in issuing Newprom awards include: time restrictions, location restrictions, gaming device restrictions, game play enhancements, award level enhancements, triggering events, and distribution means. FIG. 15-A lists the seven elements used in this example; each element is discussed in more detail below.

Distribution means (element 7 in FIG. 15) includes, but is not limited to, mass mailings, targeted mailings (i.e., identified individuals or occupants at identified locations), electronic distribution means (including targeted emailings or over the World Wide Web), directly from gaming devices, and issuing from other devices or employees or agents of a casino. It is also envisioned that Newprom awards will be distributed embedded in other promotional material. Examples would include packaged vacations or trips to a location where gaming devices are used, and where the person buying the package would be given Newprom awards to various establishments near the target location. Numerous other ways of using or promoting Newprom awards will be readily apparent to a person of average skill in the art and with the benefit of the present disclosure; all such variants are intended to be within the inventive scope of the present disclosure.

Typically the more straightforward restrictive elements are the location restrictions (FIG. 15, element 2) and the gaming device restrictions (FIG. 15, element 3). Location restrictions means the Newprom awards will be good only at a specified location or set of locations, typically the establishment that issued the Newprom award. Gaming device restrictions means the Newprom awards may only be used in a particular game; a set or family of related games; an arbitrary subset of games available at the specified location(s); or, all games.

Note that when coupled, these two elements provide a powerful means of targeting specific games, gaming devices, families of devices, games by one or more designers or manufacturers, any arbitrary subset of games, at any specified location, subset of locations, or all locations. For example, to target all Wheel Of Fortune™ games regardless of location, set the location restriction element to be "any" and the game restriction element to be "Wheel Of Fortune™". On the other hand, to target all games by a specified manufacturer or designer at one location, set the location restriction to "Harrah's™" and the game restriction element to be "IGT™", meaning any game manufactured by IGT™. This example used one simple descriptor in each element for clarity's sake; there may be any number of sets (members) or each element, and they may be individually complex sets (members).

The time restriction element (FIG. 15, element 1) is typically more complicated, having the ability to take many forms. The simplest embodiment is a fixed expiration date. The promotion credits are fully available up to a specified date and fully expire when the expiration date is reached.

Another time restriction embodiment is a progressive degradation of the net "value" of the Newprom awards as time passes. The time units may by any available time measure, but would typically be expressed in minutes, hours, days, weeks, or months. Likewise the amount of Newprom award degradation that occurs at the specified time increments may be expressed in any number of units or restrictions, but will typically be based in award units and will degrade by a specified amount that is evenly divisible into the total number of Newprom awards, going to zero after a predetermined amount of time increments have passed. The appropriate time unit to choose depends on other elements and the target gaming device. Looking at two examples will make the different applications clearer.

In one preferred embodiment, a player who has been playing a particular gaming device will be issued a Newprom award voucher after a pre-determined amount of active-gaming-time has been accrued. The Newprom awards will allow the player to upgrade all the multipliers in a secondary game by a certain amount. In this example, the Newprom awards will be aged using minutes. The player will be issued Newprom awards that correspond to a multiplier effect. The basic unit will be 2, so there will always be an even number of Newprom awards issued or available; the Newprom awards will be aged in minutes, degrading 2 Newprom awards every 5 minutes. Thus, if the player is issued 10 Newprom awards they will age to no value in 25 minutes, with interim values of: 0-5 mins, 10; 6-10 mins, 8; 11-15 mins, 6; 16-20 mins, 4; 21-25 mins, 2; 25+ mins, 0. Whenever the Newprom awards are used, they enable a Newprom enhancement that will have the multiplier effect of their current award value (i.e., if the player enters a bonus game after 14 minutes of play since being awarded the 10 Newprom awards, she will be granted a multiplier of 6.). After one use, they are gone.

A specific gaming embodiment would be an enhanced version of IGT™' Wheel Of Fortune™. A description of an enhanced version of Wheel Of Fortune™ is given below. This is being used an illustrative example to make the concepts clear; the description is in no way limited by the Wheel Of Fortune™ example.

Figure 16:
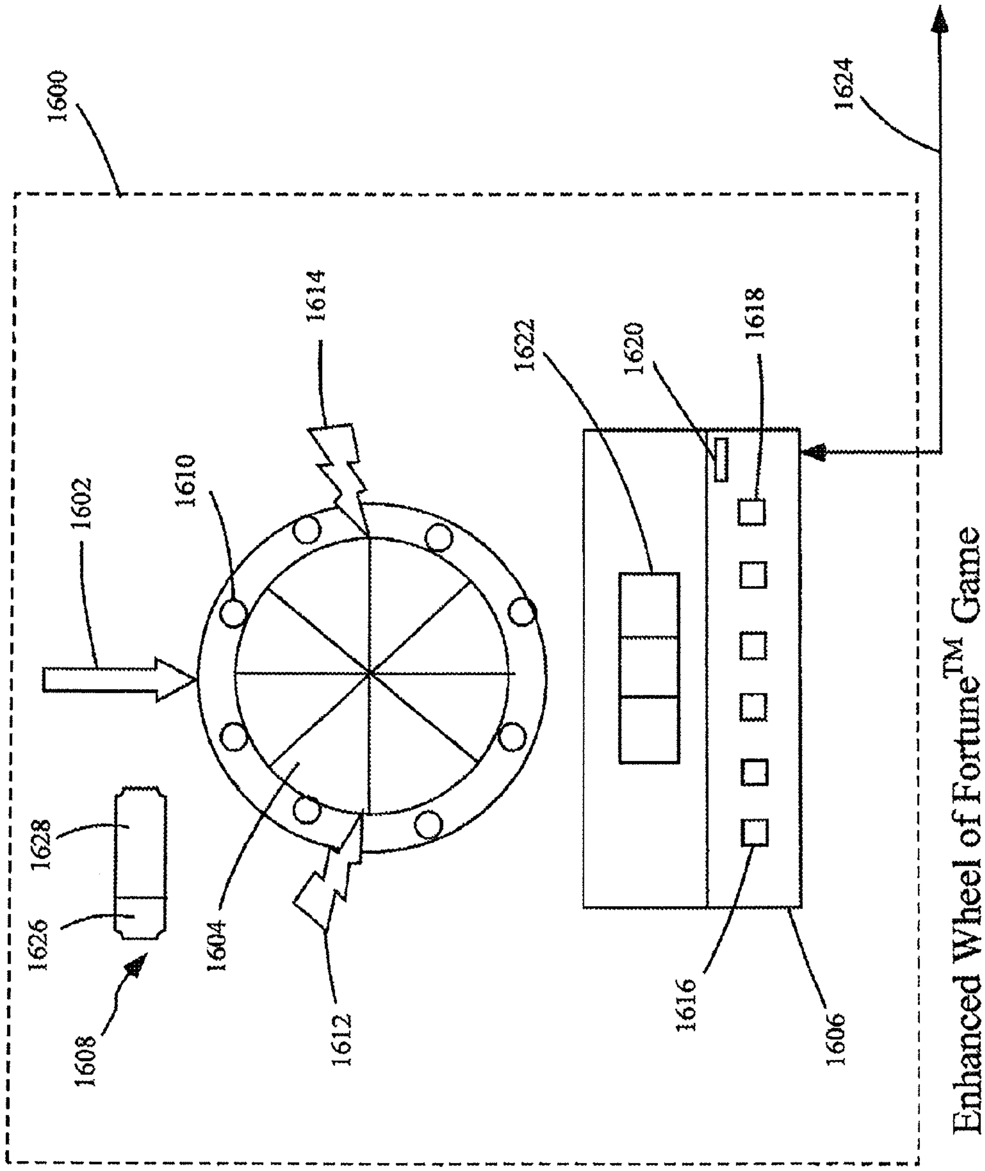
FIG. 16 is a functional block diagram of an enhanced Wheel Of Fortune™ gaming device.

A functional block diagram of an enhanced Wheel Of Fortune™ game is shown in FIG. 16. The Wheel Of Fortune™ game 1600 has the well-known primary game, indicated by a set of visible game indicia 1622. It also has the Wheel Of Fortune™ secondary game, with wheel 1604 and pointer 1602. Wheel 1604 spins about its center point. The standard secondary game is enabled by an event in the primary game, typically at least one wheel indicia showing on the payline. Once enabled, a player uses a button 1616 to initiate the spinning of wheel 1604. The wheel spins and comes to a stop; pointer 1602 points to a segment of the wheel and indicates any winnings (additional playing credits). In an enhanced version of the game, there is at least one interface for Newprom awards to be read in and read out. In a preferred embodiment, the reading device handles both promotional instruments and prize bearing instruments, so would be a combined PBI/NI reader, shown as reader 1620. GSI is not mentioned due to the fact that in this particular game design there is no game state that a player can take with them when they stop game play. Reader 1620 may be used with any instruments carried by the player such as vouchers, smart cards, etc. Alternatively, network connection 1624 may be the source of Newprom award input and output, using a back-end server and database (not shown). A preferred embodiment will have both means available for use. Button 1618 is provided to the player so the player may "cash out" (retrieve unused Newprom awards) when they wish.

FIG. 16 shows three distinct Newprom enhancements that can be triggered by a player's Newprom awards. The first Newprom enhancement is additional payout pointers 1612 and 1614. These work by lighting up or similarly being shown as active before a player starts the wheel spinning. Depending on the Newprom awards, one or both may be activated. The standard pointer, pointer 1602, is always active. When the wheel stops, the player claims the highest prize that is being pointed to by any of the currently active pointers. Thus, the player looks at the segment being pointed to by regular pointer 1602, as well as pointer 1612 and/or pointer 1614, for the highest winning segment.

The second Newprom enhancement is a set of indicia 1610 that lies circumferentially outside of wheel 1604. These indicia match indicia in the wheel segments, indicating specific enhanced payouts. If the wheel is spun and stops with any active pointer (pointer 1602 which is always active, or either of the special pointers 1612 or 1614) pointing to a segment containing an indicia that corresponds to a lit indicia outside the wheel, the reward is enhanced by a multiplier.

The third Newprom enhancement is shown as jackpot window 1608. Jackpot window 1608, when invoked by the use of Newprom awards, contains two fields. First, indicia in window segment 1626 will appear which corresponds to one of the segments in wheel 1604. That segment is the jackpot segment for this spin. Second, a jackpot amount will be shown in jackpot field 1628. If the wheel stops such that an active pointer is pointing to a segment which has an indicia corresponding to the indicia shown in window segment 1626, the player wins the jackpot shown in jackpot field 1628.

The Newprom enhancements are designed to be invoked in a graduated manner. The lowest level of enhanced play involves the use of peripheral indicia 1610. The indicia are set to payout relatively small multipliers on the wheel segment amounts, but at a significantly high hit rate, the goal being that a player who has enhanced the play of the game using Newprom awards will win additional game play credits at a much higher rate than players without Newprom awards.

The Newprom second enhancement level uses the additional pointers. Higher amounts of Newprom awards than required for the peripheral indicia will activate the additional pointers, with the player being more likely to win more game play credits as a result. The secondary game will be configured to award more game play credits for the higher level of Newprom awards used to invoke the additional pointers.

Finally, the jackpot Newprom enhancement can only be invoked with a significantly higher value of Newprom awards than the previous two levels, or by having a specifically designated Newprom award. The jackpot may be implemented as an individual jackpot based solely on the presented Newprom awards, or may be implemented as part of a progressive game, coupled with other similarly configured games.

Note that the other games (due to the flexibility and configurability of Newprom awards) participating in the progressive game need not be the same game in other cabinets, nor from the same game family, nor from the same manufacturer, nor any other similar restriction. The others participating in the progressive may be defined in any manner that correlates any group of Newprom awards with any group of users. This will typically be done by correlating Newprom awards with player IDs or voucher IDs on the casino's back-end or player tracking database, then grouping the players into defined progressive game groups. The progressive groupings may also be self-enrolled, allowing a group of friends to have fun awarding a progressive jackpot to "one of their own."

Continuing with an example of time restrictions that would be measured in minutes, when a player has been playing Wheel Of Fortune™ for a predetermined amount of time a Newprom award voucher is issued with a value of 10. These Newprom awards are very limited. They are good only in this casino on this specific Wheel Of Fortune™ game and will be aged to 0 Newprom awards in 25 minutes, as described above. If the player accesses the secondary game at some time during the 25 minutes after the Newprom award is issued, the player may insert the Newprom award voucher into reader 1620 in the gaming device. The gaming device will change state, using the current value of the Newprom awards as the determiner. In this example, assuming the player has no other Newprom awards to add to the ones just issued, the Newprom awards will invoke the first level enhanced game level by using the peripheral indicia 1610.

After the peripheral indicium is lit, the player causes the Wheel Of Fortune™ wheel to spin by touching the regular "spin" button. Wheel 1604 stops, and if the lit indicia and the indicia in the wheel segment pointed to by pointer 1602 are the same, the player gets an enhanced number of additional game credits.

Continuing with another example of time restrictions using time units of months, an embodiment of the invention distributes Newprom awards in mailings to identified customers of a particular casino. The location restriction is to one casino. However, rather than being limited to one gaming device or one game as in the short-term Newprom awards, the Newprom awards issued here may be used in any gaming device in the casino that has a Newprom award reader (allows for the use of Newprom awards). The effect of using the Newprom awards will not be directly on the game state as it was in the previous embodiment; rather, it will be to add value to the prizes available to the identified player.

The Newprom awards will be reduced at each month boundary from the time of issue. Because these Newprom awards are in the form of increasing prize values won by playing a gaming device in the specified casino, there may be any number of ways of both awarding and decrementing this value. A typical method would be having a class, a designated set, or an arbitrary adder value. When used right away, the Newprom awards will upgrade a win of class or level up one gradient, coupled with comp meals (or something similar). As the Newprom awards age, they may lose the "adder" portion of the initial awards, such as losing the comp meals. Thus, at each month's boundary since issuance, the Newprom awards value decreases by one comp meal, until at the last month it expires altogether. Innumerable other variants will readily spring to the mind of a person of ordinary skill in the art and with the benefit of the present disclosure; all such variants and unitized enticements are within the scope of the present disclosure.

Other embodiments of the description will make use of hours, days, or weeks. Embodiments making use of hours would be likely to have a combination of constrained location use with expanded gaming device use. The expanded gaming device use would include a family of gaming devices rather than a specified single gaming device, or a gaming device that is specifically not the one currently being played by the player to encourage different or new machine use (encourage the player to experiment).

Embodiments making use of days as time intervals could be targeted at individuals who will be in a location for designated, limited amount of time (but longer than an evening) such as a week at a casino/resort. To encourage play and experimentation, Newprom awards issued to vacationers would be issued to expire at various points during the stay, measured in days, starting from the person's arrival time.

Embodiments making use of week intervals would typically be targeted at local players or local populations (i.e., people living near a location rather than passing through or on location due to a trip/vacation). In these cases the target population could be identified players, direct mass mailings, or locally distributed advertising (i.e., an insert in the Sunday paper). Newprom awards could be designed to expire after a week, or could be issued to degrade over a target time period such as a month, using weekly degradation intervals. The weekly degradation process could be tied to all the above-mentioned Newprom award loss measures. This includes reduced multipliers on specified games, reduced choices of gaming devices to use, or reduced comps, as well as any other time-based reduction in choices or rewards.

Other time based embodiments will include specified times in which the Newprom awards may be used, as well as an expiration date and/or degradation to a null value. An example embodiment of Newprom awards having specified times is the issuing of a general mailer to the local population of a voucher that expires in 4 weeks, and where each week the Newprom awards can only be used on specified days, such as Tuesdays and Wednesdays. This helps target typically slower days at a casino or arcade establishment.

Other ways of using time-based Newprom award will readily come to mind of a person of ordinary skill in the art and with the benefit of the present disclosure. This includes both the above-identified time units of minutes, hours, days, weeks, and months, and other measures of time including combinations of the units used as examples.

The next element to discuss is the gaming device restriction (FIG. 15, element 3). Typical uses would include limitation to a specific machine, to a specific game (i.e., Wheel of Fortune™), to a specific family of related games (variations on poker, or all games from IGT™), or to any other collection of gaming devices or games that may be of promotional use to a generator of Newprom awards (any collection may be specified in the element's sets).

The next element to be discussed is the game play enhancement element (FIG. 15, element 4). Game play enhancements are intended to invoke a unique state in the game being played that are not usually available to a player. The enhanced state may take numerous forms, and is not characterized as not being coupled simply and directly with award level enhancements (i.e., additional paylines may be added but payout amounts per payline remain the same, whereas an award level enhancement ups an award won through normal game play). Example embodiments span the range from additional winning indicia on a base game to the ability to invoke a unique game.

One general embodiment of enhanced game play involves additional winning indicia on a base game. If the base game is a reel-based game, when the enhanced game play is invoked addition symbols on the reels may be used to complete paylines that invoke a secondary game. In poker-based games, the enhanced play would entail designating wild cards (i.e., "deuces wild"). In another embodiment, the enhanced game state invokes at least one additional payline not otherwise available, which may lead to more payouts or to more chances to play a secondary game.

Other embodiments will focus on the secondary game. As with the primary game, the basic game enhancements will typically include additional winning indicia on wheel and reel games, or additional paylines for those games that have paylines. An example is the enhanced version of Wheel Of Fortune™ of FIG. 16, where additional pointers are added (enabled) for enhanced game play. This is the wheel-based equivalent of adding paylines to reel-based games.

The next step in enhanced game state embodiments involves invoking an entire game that is not otherwise available. This may be invoked for either the primary game or, if one is available, the secondary game. In an embodiment where it is the primary game that changes, using Newprom awards will change the game from one to another, such as a single-hand poker game to a six hand simultaneous play game. The change may be more dramatic as well, especially if the game is video-based (i.e., it is run by software rather than being a physical implementation of wheels and reels). In that case, the entire game may change the base game may be one of the well-known poker variants, whereas the invoked game may be an entirely different game of chance.

Figure 17:
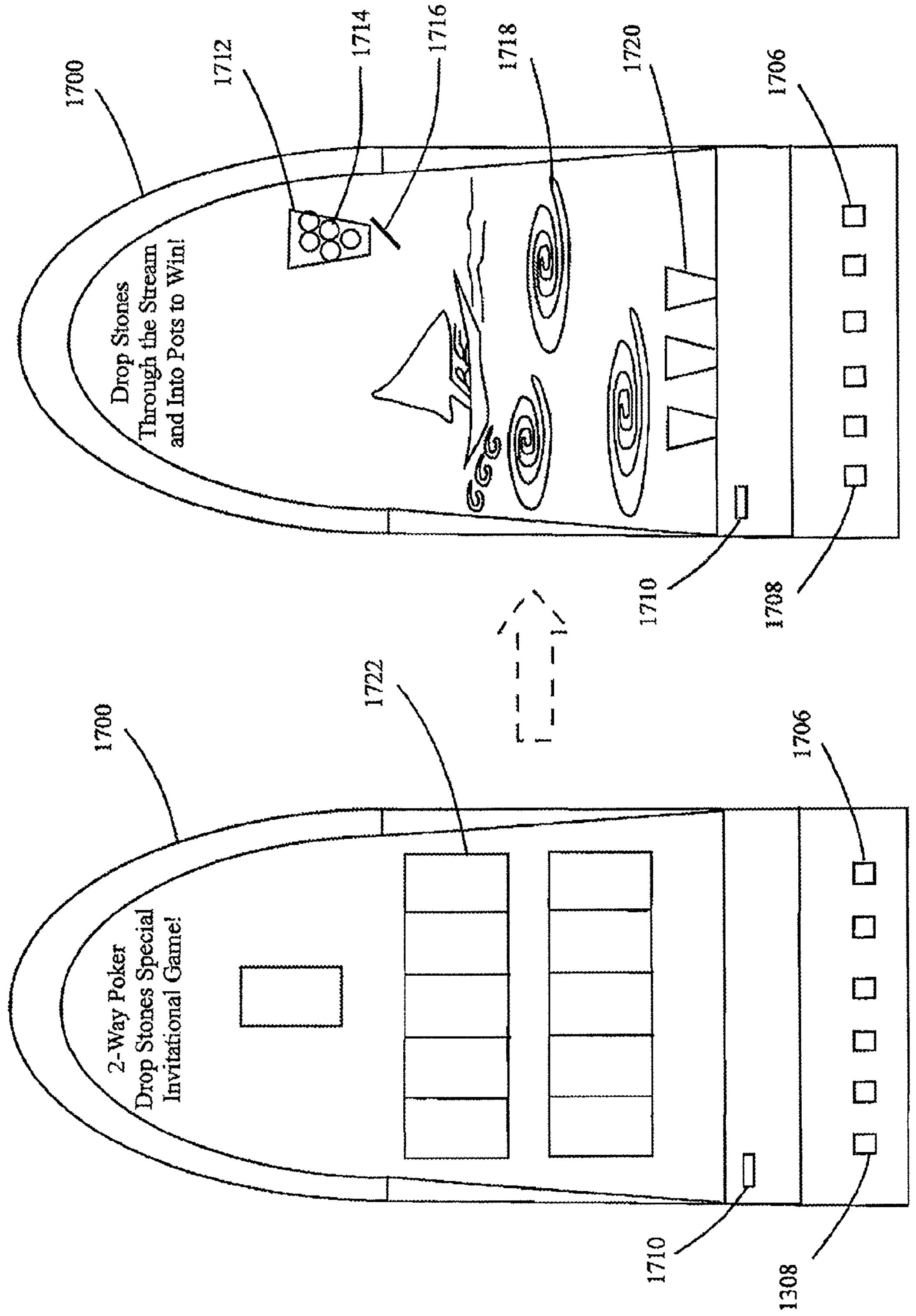
FIG. 17 is a diagram of a game according to one embodiment.

An example is shown in FIG. 17, where a standard poker game becomes a game called "Drop Stones" based on the fall of objects through running water into one of a plurality of "receiving pots." Gaming device 1700 has a standard set of buttons represented as 1706 and 1708, and a PBI/GSI/NI input/output device 1710. The standard game is a poker variation, perhaps with multiple hands 1722. When the needed amount and/or type of Newprom awards are inserted into PBI/GSI/NI input/output device 1710, the game, using known hardware and software components, switches state to the alternative game which is displayed on the gaming device's video output (screen). In this case the game is called "Drop Stones," a chance, semi-skill, or skill game (depending on the implementation, it may have one, two, or all three choices available). A certain number of stones 1714 are contained in basket 1712, which has a bottom hatch 1716 that lets out one stone at a time. The hatch is under the control of the player, who uses button 1708 to release one stone. The stone drops through a river flowing left to right on the screen. Current eddies 1718 alter the course of the stone as determined by the gaming device's software. The player has the feel of effecting the outcome of the game because they try and use the main current and the eddies to move the stone just the right amount of distance downstream, thereby increasing their chances of having a stone drop into a winning pot 1720. The player's actual effect on the stones' drop through the water will depend on the software, and may be predetermined on chance or a fixed pool, may use a baseline chance outcome coupled with a skill delta, or be based entirely on skill.

Likewise, the enhanced game state may consist of a secondary game that can only be invoked with the use of Newprom awards. Like the case with the primary game, the change to the secondary game may be relatively minor (going from one throw of dice to two throws of dice) or major (going from a simple rotating-wheel-like game such as Wheel Of Fortune™ to an investment bonus game that accumulates bonus points as you play).

Continuing with a discussion of award level enhancements (FIG. 15, element 5), this element is fairly intuitive and is usually used in expected ways. Award level enhancements affect potential payouts to the player. Award level enhancements may run from simple multipliers of certain prizes (usually a multiplier on the amount of game credits a player wins) to invoking new pay tables that change the payout structure of the entire game. Award level enhancements may also take the form of moving previously neutral game states (non-pay-out-states of game play) into pay states.

A simple embodiment of enhanced award levels is illustrated in the Wheel Of Fortune™ example. The new pay table used to increase the overall additional payout of game play credits (coupled with the peripheral indicia) provide an enhanced award level when used in the secondary game.

A more complex embodiment of an enhanced award level could use the jackpot window addition to the Wheel Of Fortune™ secondary game. In this embodiment the jackpot outcome is based on the where the wheel stops. If the wheel stops with an active pointer pointing to a segment having the same indicia as the jackpot window, the player wins the jackpot amount shown, and the jackpot amount shown is a multiplier of the winning segment.

Continuing with the discussion of the award level enhancements, an even more complex embodiment would invoke an entirely new pay table and with it, a new pay-out structure. The new pay-out structure can be designed to entice players in any number ways. One would correspond to enhancing already winning states—an extension of the multiplier principle. Another embodiment would be to skew the winnings to a different area of play: making medium or low per-payline bets on a game with selectable betting payout amounts significantly sooner, thereby enticing the player to switch to max betting amounts. Numerous other ways of using changeable pay-out tables will readily come to the mind of those of ordinary skill in the art and with the benefit of the present disclosure.

Award level enhancements also include all interactions directly with prize stations. In this case, the Newprom awards will either be used in conjunction with a winning output from a game designated within the Newprom award itself (included, of course, the option of any win from any game), or may be redeemed alone. In the first case, the preferred embodiment will have the Newprom award acting as a level upgrade in the award (i.e., from a "silver" level prize to a "gold" level prize, using the prize levels illustrated in FIG. 11). In the second case, the Newprom award will typically be issued as the result of game play or in a manner similar to "comps," being the result of other activity. Numerous other forms of award-level enhancements compatible with use at a prize station will readily come to mind to a person of average skill in the art and with the benefit of the present disclosure.

The next element used for determining Newprom awards is the triggering event (FIG. 15, element 6). The triggering events can be local to the gaming devices or non-local. Non-local triggering events include any and all reasons Newprom awards may be awarded, based on criteria used by the issuing establishment that are not tied with the player being at or near gaming devices at the time of issuance. Typically, this would include searching a player database using a set of criteria such as last visit, amount spent, length of stay, birthday, anniversary dates, and the like, or be based on criteria established for mass mailings. Based on the target audience, the other elements are set to create Newprom awards best suited to those who will receive them. Alternatively, the Newprom awards may be based on any other set of criteria, including Newprom awards designed for a target group based on nothing but the whims of the Newprom issuer ("Hey, let's issue Newprom awards for everyone in our player's database born today because I feel good"). After using whatever selection criteria chosen, the Newprom awards are then issued.

Looking at local events used to determine the issuing of Newprom awards include number of plays at a certain gaming device, overall time at a certain gaming device, overall contiguous time in the establishment issuing the Newprom awards, total amount spent in a contiguous time period, and specified triggering events on the play of the gaming device currently being played. Each of these individual local events can be set to a specified threshold value or trigger value; when the player hits or exceeds the values or events, Newprom awards are issued based on the settings of the other five elements or any other basis that the issuing establishment chooses to use.

Looking at the characterization of a game enhancement coupled, triggered, or used by Newprom awards, it may be apparent that there may be some arbitrariness in the characterizations. Using the enhanced Wheel Of Fortune™ game as an example, note that the jackpot window could be used for both game play enhancements and award level enhancements, as will be the case with many added aspects to any base game. It is true that how an addition to a base game is characterized, in the jackpot window's case as either a game play enhancement or award level enhancement, will at times be a close call. It may well be an arbitrary call, because the addition could involve aspects of both.

It is important to realize that the inventive nature of the present disclosure does not depend on which of the seven elements an implementer places her or his improvement (although for the sake of clarity, interoperability, program maintenance, and the like, following conventions and guidelines, such as described in this disclosure, is recommended). As long as the Newprom award interpreter knows how to change the game, make awards, and the like, based in the information contained in the Newprom award or awards, the invention can be practiced.

In fact, in a worst case scenario from a system maintenance viewpoint (although the invention would be perfectly functional), each Newprom award could be generated by a random number generator, with a huge lookup table correlating the actions to be taken with each random number generated. Such an implementation, though not recommended and far from any form of engineering optimality, could be made functional. Thus, the disclosure is not dependent on any particular characterizations of Newprom awards into elements; the element analysis is, however, one preferred embodiment for creating Newprom awards.

The Newprom interpreter is defined as the combination of hardware and software components that are used to read a Newprom award, called a Newprom enhancement in the applicable device, as input (in any form, from a voucher to a database entry) and trigger or cause to happen the corresponding changes to any device needed to carry out or implement the result embodied in a Newprom award. The set of hardware and/or software that is required to carry out the functional equivalent of the Newprom interpreter may physically reside in a number of places.

Using the seven elements just described (herein defined as the "standard elements" or the "seven standard elements") in combination will yield virtually unlimited variations of Newprom awards, all of which can be tailored to the needs of the establishment issuing the Newprom awards. In addition, the seven elements discussed above (time restrictions, location restrictions, gaming device restrictions, game play enhancements, award level enhancements, triggering events, distribution means) is not in any way an exhaustive list. Newprom awards may be designed using any types of restrictions, enhancements, events, or other issuing paradigms. An example not using the seven elements just described is where each game type has a unique program or trigger, sharing nothing with the programs that trigger Newprom award issuance in other gaming devices. All such methods of creating Newprom awards are within the inventive concepts of the present disclosure.

In one embodiment, each of the seven elements will be assigned a set of possible choices corresponding to a target population or a target gaming device. Using the example of the enhanced Wheel Of Fortune™ gaming device, the seven elements may be defined as shown in FIG. 15-B. The set of states that comprise each element are then interconnected algorithmically by a program; the algorithm and the states comprise data structures in any medium readable by a CPU in a computing means. Each time a state changes (i.e., if the time restriction states included the two states of (1) active-game-play-time state with a value of 20 minutes, and (2) total-value-played state with a value of 200 game credits, any time a player met either of these two criteria that state would become true from having been false, causing a state change) an algorithm in a program will check the states and, if the states meet a predetermined state configuration, Newprom awards will be awarded by the distribution means indicated. Please note that the example game states listed in FIG. 15-B are extremely simple, for illustrative purposes only. Any actual implementation of states associated with the seven elements will be far more complicated.

Figure 23:
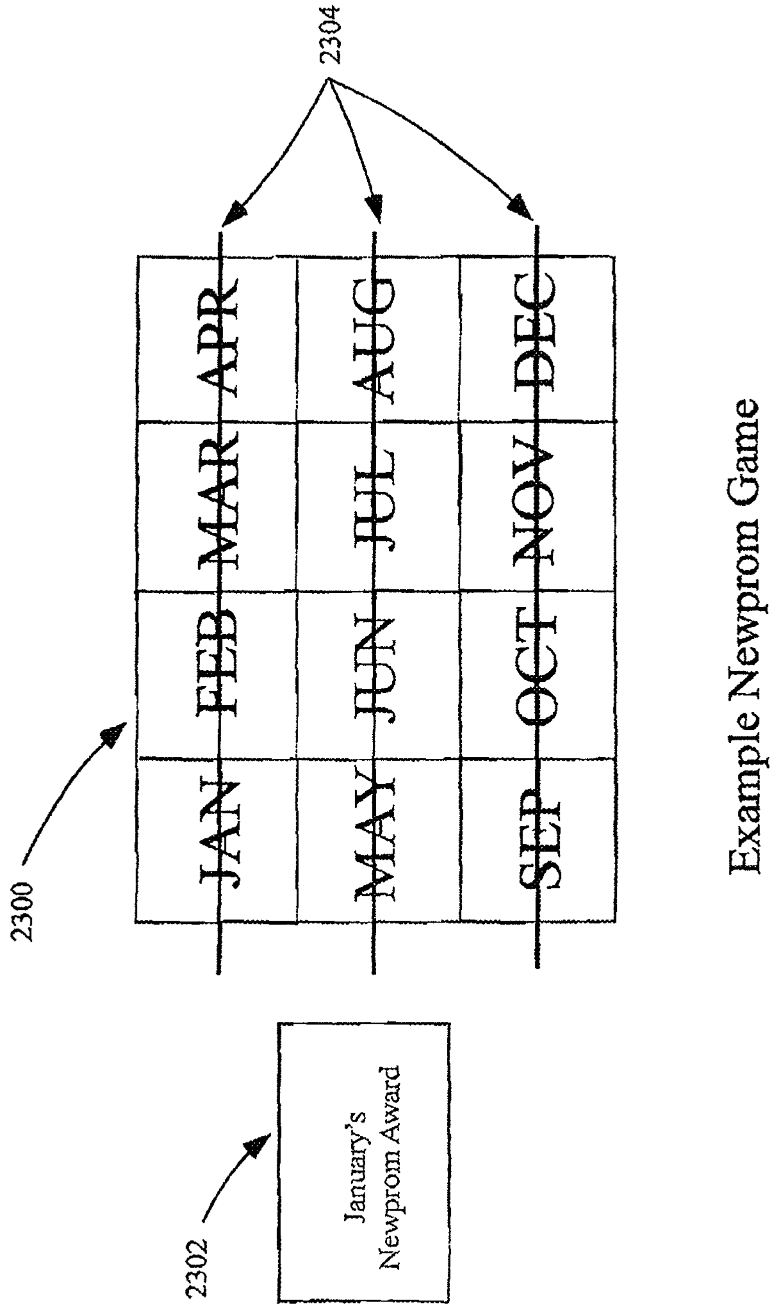
FIG. 23 is a block diagram showing a game using Newprom awards.

An example Newprom game is shown in FIG. 23. A game board having 12 boxes labeled with the 12 months of the year (2300) is sent to the identified players (i.e., players who already have player tracking cards) from a particular casino. In addition, they are sent a Newprom award for January (2302). Instructions sent with the game explain that the player will be sent a new Newprom award every month, and that for each month the Newprom award enables a special bonus game in a specified game.

In addition, the special bonus game is offering a special progressive window, the progressive prize being shared by others in playing this game. The progressive window will only be displayed on Tuesdays and Wednesdays, so to have a chance to win the progressive game you must play the designated game on the designated days. Finally, an award structure is explained to the players. In addition to the possibility of winning the progressive that ONLY the players of this game have access to, filling in any of the shown "paylines" (indicated by 2304) also yields prizes.

Simply playing the game, even once, shown on each month's Newprom award will get a "P" stamp to paste on that month's square. If you play and win a prize or awards from the standard game, you will also get an "S" sticker for that month. If you play and invoke the special bonus game (e.g., only available to people playing this board game) and win, you will get a "G" sticker to place in the corresponding month's square. Paylines on your board game may payout as hereafter described. For all "P"s, a casino sweatshirt is awarded (and will be included in the following month's Newprom award, since Newprom awards have the ability to specifically identity prizes as well as act as enhancers). For all "S"s, a leather jacket will be awarded (again, will be included in next month's Newprom award). Finally, all "G"s will be awarded an ATV or Jet Ski. To complete the package, the board will be sent with a set of five casino magnets, four to hold the corners of your board on the fridge, and one to hold this month's Newprom award. Not only that, the magnets will be special issue, only given to this year's board players.

As will readily be seen, this type of game can easily and readily accomplished using Newprom awards and would not be possible without them. The batch or cron job running on a computer in the back of the issuing casino will generate, automatically, the Newprom awards needed for each month (and a final prize-only mailing in January of the following year if prizes are awarded during December). Using the time restriction element, game restriction element, location restriction element, enhanced game play element, and enhanced award level element the Newprom awards are easily configured from each element's predefined set that includes these choices. Each Newprom award mailed is also tied to a player. Newproms have a unique ID field that allows tracking individual Newprom award(s). In this case, the player IDs may be placed directly on the Newprom awards in that field, or the back-end database may couple the issued Newprom award with a player ID.

The above example was a simple game used for illustrative purposes. Having introduced the Newprom awards and shown the general type of promotional meta-games that may be implemented by virtue of the above example, it will be readily apparent to one of ordinary skill in the art and with the benefit of the present disclosure that a virtually unending set of unique meta-games may be created, encompassing heretofore unknown and unavailable targeting combinations of individual games, game families, manufacturers, designers, game types, locations, intra-location and inter-location game "board walks", individual identified ("ID'd") players, sets of individually ID'd players, targeted demographic groups, and the like. An entirely new world of possibilities is enabled using the herein disclosed Newprom awards.

Figure 18:
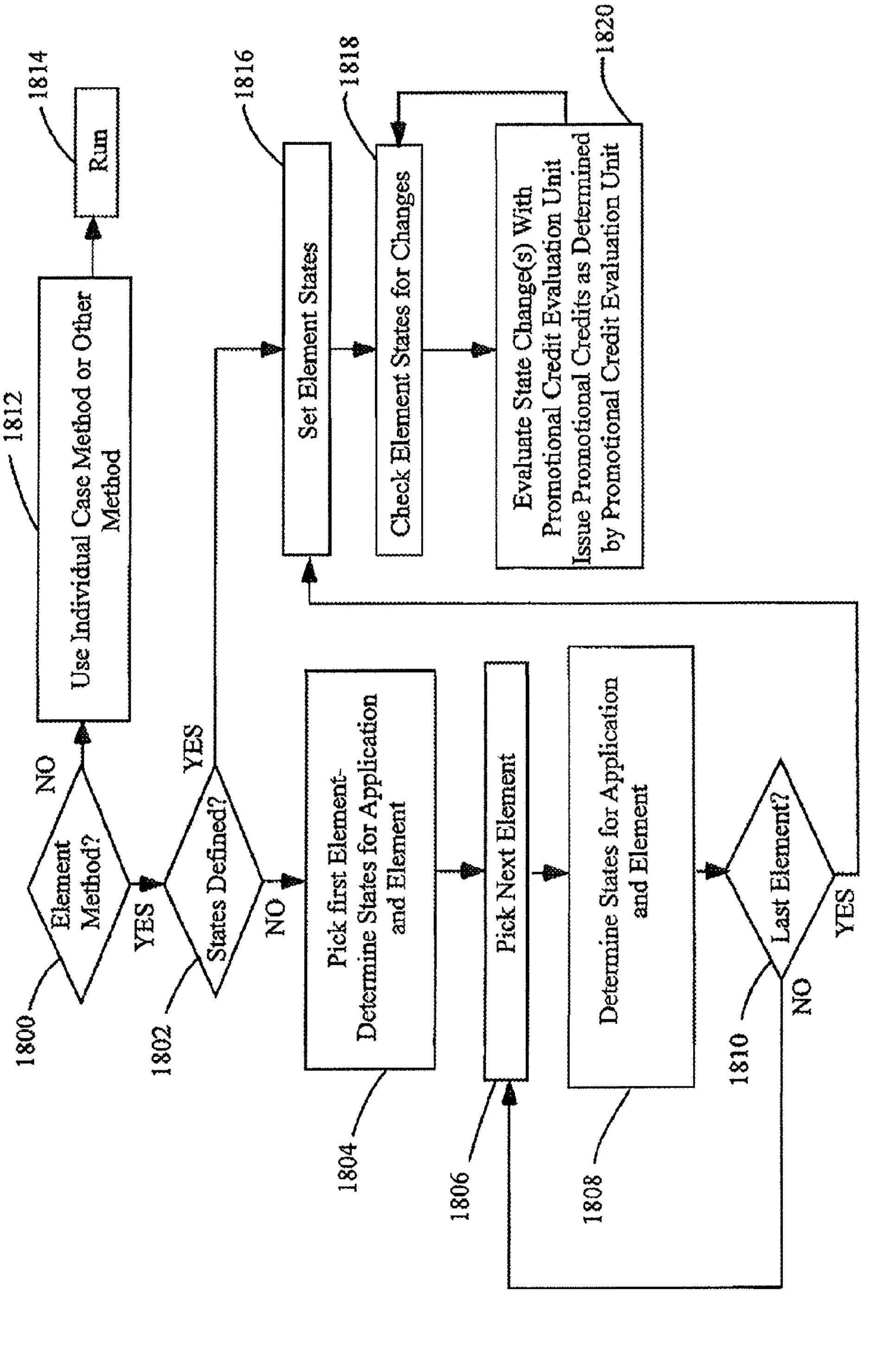
FIG. 18 is a flow diagram of a method for determining promotion awards.

Continuing with FIG. 18, a method of determining and using states and elements to determine Newprom awards, and how to use them, is shown. Decision diamond 1800 asks if the method to be used in determining Newprom awards is to be element based or some other method. If the method to be used is not the element method, the "NO" exit is take to box 1812.

The action taken in box 1812 is to use either the individual case or the other method, described earlier. An issuing establishment may have its own algorithm for determining when, where, and how to issue Newprom awards. After the unique or proprietary method is used, the process continues into box 1814. The method used to determine the algorithms for creating Newprom awards will also determine how the process continues to run. Whatever that process is, the process as designed continues to run in box 1814 until ended.

If the method to be used is the element method, the "YES" exit is taken from decision diamond 1800 to decision diamond 1802. The question is whether the states that comprise each defined element been properly defined. If they have, the "YES" exit is taken to box 1816. If they have not, the "NO" exit is taken to box 1804.

The action taken on box 1804 comprises picking the first element (in the above example, that would be the first element of the seven defined), then to determine and define states needed for that element as it relates to the game or casino from which the Newprom awards will be issued. After the state set has been determined for the first element, box 1804 is left and box 1806 entered.

The action taken in box 1806 is to choose the next element in the list; in the example discussed above, that would be element two of the seven. Box 1806 is now left and box 1808 entered. Box 1808 entails determining and defining the states needed for this element, similarly to the action taken for the first element in box 1804. After the state set has been determined for this element, box 1808 is left and decision diamond 1810 entered.

The choice at decision diamond 1810 is to determine if this is the last element or not. If it is, the "YES" exit is taken to box 1816. If it is not the last element in the list, the "NO" exit is taken to box 1806, where the next element is chosen. The loop comprising 1806, 1808, and 1810 is continued until all the elements have had their states defined, after which box 1816 is entered.

Box 1816 is a dividing box between element state definitions and using the now-defined elements. Typically, for a particular application, the actions taken in boxes 1800 through 1816 are executed rarely, corresponding to the introduction of new gaming devices, changes to the floor, and the like. On the other hand, the loop comprising 1818 and 1820 is intended to run continuously for those Newprom awards given out on a regular basis (typically these will have time constraints measured in minutes). For those Newprom awards with time units measured in hours, days, weeks, or months, a batch job running on a central server (cron job, for you UNIX folks) every ½ hour or hour could be used to check state and generate any triggered Newprom awards.

The action taken in box 1816 is to set all the states to a predefined condition. For example, if this where the enhanced Wheel Of Fortune™ gaming device then one of the states in the triggering event element could be time-played, and it would be set to 20 minutes. This would be initialized to false, and would be set to true if it ever happens that a single player plays the machine for 20 contiguous minutes. Box 1816 is left, and box 1818 is entered.

The action taken in box 1818 is to continually check for any state change. If any state in any element changes, box 1818 is left, and box 1820 is entered.

Box 1820 entails reading the current set of states in all the elements and then using a predefined algorithm to determine if any Newprom awards should be issued, and how. Note that not all state changes will correspond to the issuance of Newprom awards. After making the determination, then issuing the Newprom awards or causing them to issue by another, for example, by notifying the casino to mail something to the person playing the gaming device or notifying a floor walker to give something to the person at a specified gaming device, box 1820 is left and box 1818 is re-entered. Box 1818 and 1820 loop until the gaming device or casino reinitialize the overall process.

FIG. 18 is one example of a Newprom generator. A Newprom generator is any combination of hardware and software, including but not limited to printing means, magnetic strip encoder, database, input/output devices, optical readers and writers, IR or RF devices, and the like, that may be needed to implement the form of Newprom award any particular issuer may desire. This spans the entire technical range from a simple bar coding device producing bar-coded paper tickets with no networking connection to either itself or to, or between, the gaming devices that will use the encoded tickets (this, of course, includes an even lower-tech implementation such as a manually-derived print image on a manually-driven reproduction device, (although such an implementation would not typically be used in the US), to a networked central server and dedicated computer running a fully automated Newprom generation, issuance, and recognition system, being connected to all devices to which a Newprom award issued by this issuer may be presented.

Figure 19:
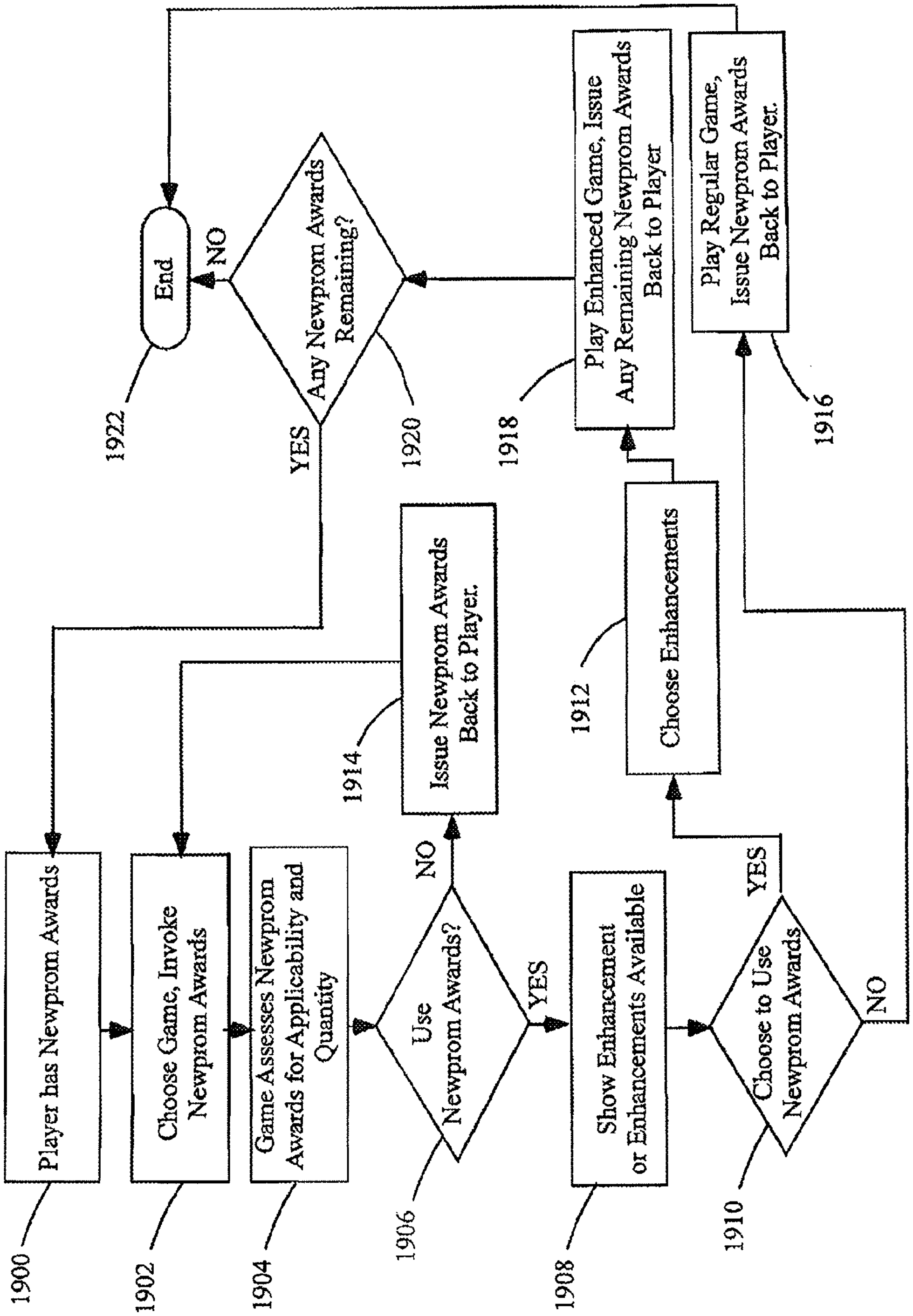
FIG. 19 is a flow diagram showing a method of using promotion awards.

Continuing now with FIG. 19, a method of using Newprom awards by a player is shown. The initial state is shown in box 1900, indicating the player has some form of Newprom awards. The credits may be in a form carried by the player (voucher, smart card, and the like) or may be stored in a backend database at the casino or playing establishment that issued the Newprom awards. No matter what the form of the credits or how they are stored, the player having credits enters the establishment that issued them.

Box 1902 is now entered, where the action taken is the player choosing a game that is enabled for Newprom awards. This will be evident on the face of the gaming device, as the device will need to have some input area for use by the player. The input area will have (a) a reader for Newprom award vouchers, smart cards, and the like, or (b) a reader for player ID cards, user ID cards, or ID vouchers that correlates the player to Newprom awards in a backend database, or (c) an interactive interface that allows the player to enter a code or ID number on a touch screen, keypad, or other input device such as a voice interface. The player will use the input area as needed. If the player is carrying the Newprom awards (i.e., voucher), then the gaming device will read in the data coming from the input device. If the player inputs ID only, the gaming device will need to be on operative communication with a backend database, from which it extracts the Newprom awards associated with the player ID. Box 1902 is exited and box 1904 is entered.

In box 1904, the gaming device assess the Newprom awards. A check is made of the Newprom awards by the Newprom award assessment unit of the machine. Alternatively, this assessment unit may be located in a backend server if the gaming device is networked. The Newprom awards presented to the gaming device must: (1) be usable at this time, day, week, and month and not be expired; (2) be usable at this location—this floor of the casino building; (3) be usable on this gaming device; and (4) be able to invoke an enhancement (at least one Newprom enhancement) on this gaming device, either by the type of Newprom awards or the value of the Newprom awards.

Decision diamond 1906 is now entered. If the Newprom awards are assessed as being usable, the "YES" exit is taken to box 1908. If the Newprom awards are not usable for any reason, the "NO" exit is taken and box 1914 is entered.

In box 1914, the Newprom awards are issued back to the player. If the Newprom awards were in a form carried by the player, the gaming device my issue a new carrier from (i.e., a new voucher) or may simply return the player carried device that was presented to the machine, using some type of indicator to the player of why the Newprom awards could not be used. If the Newprom awards are stored in a backend database, the state of the player's Newprom awards are left as they were. Box 1914 is now left and box 1902 is entered. The player may now reinitiate the process starting at box 1902, or come back later. If the Newprom awards are usable at the chosen gaming device, then box 1908 is entered. The gaming device indicates it can accept the players Newprom awards and, if the player has a choice of how to use the Newprom awards, asks the player to choose via an input device (typically a touch pad or buttons). The gaming device asks the player to confirm the usage of the Newprom awards, at which point box 1908 is left and decision diamond 1910 is entered.

In decision diamond 1910, if the player confirms the use of the Newprom awards and/or makes a choice between uses of the available Newprom awards (again, typically through a button or touch screen display) the Newprom awards are considered redeemed and are no longer available to the user (although the user may still have remained or unused Newprom awards), and the "YES" exit is taken to box 1912. If the player does not want to use any Newprom awards at this time, the "NO" exit is taken to box 1916.

In box 1916, the player's Newprom awards are re-issued in the same manner as they were in box 1914, and the gaming device enters normal (non-Newprom enhanced) play. The process now continues to end box 1922, as typically the Newprom award usage is finished for this use of the particular gaming device.

If the player chose to use Newprom awards after decision diamond 1910, then box 1912 is entered. The player chooses an enhancement in box 1912, typically by touching a button on a touchscreen, but any other input means may be used. After selecting an enhancement, box 1912 is left and box 1918 is entered. In box 1918, the player's Newprom awards are reduced by an appropriate amount based on the selection made in box 1912. Any remaining Newprom awards are issued back to the player and are returned using the means explained for box 1914. Additionally, some gaming devices will allow the player to choose which method to use—issue something the player may carry with them (i.e., a voucher) or store the data in a backend database. After issuing any unused Newprom awards the gaming device enters the selected enhanced play state and play continues. Box 1918 is then left, and decision diamond 1920 is entered.

Decision diamond 1920 determines the answer to the question of remaining Newprom awards. If the player has none, the process of using Newprom awards is over. The "NO" exit is taken to end point 1922. If, however, the player still has Newprom awards (either in hand or in a back-end database), the "YES" exit is taken to box 1900, where the process continues until the player has no more Newprom awards.

Figure 20:
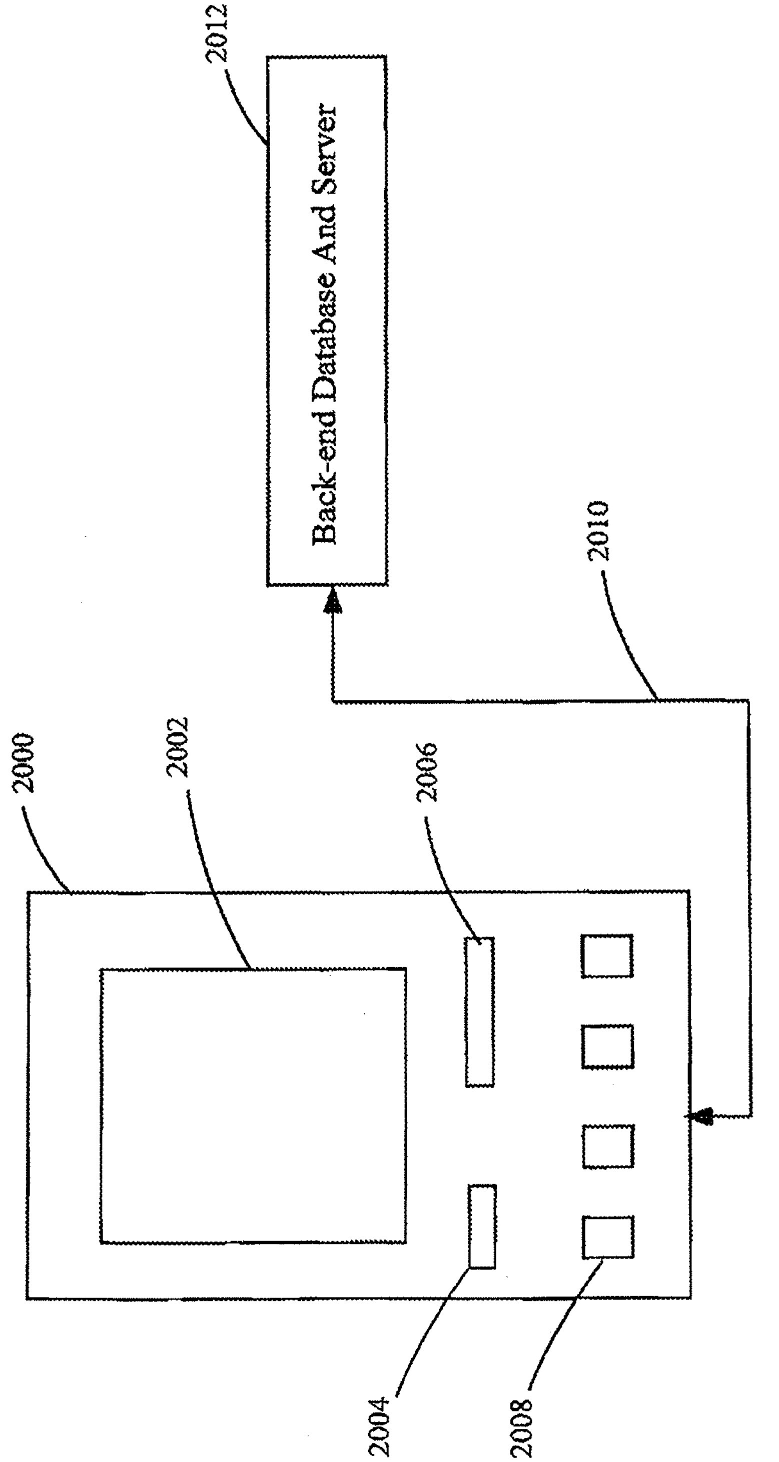
FIG. 20 is a functional block diagram of a promotion award status device.

In addition to using Newprom awards in a gaming device, the description also provides for a method and apparatus for checking the state of any Newprom awards a player may have, illustrated in FIG. 20. A player may use the Newprom award status device 2000 by presenting a Newprom award voucher or Newprom award ID (which may be a voucher, smart card, player's card, or other similar instrument) at PBI/GSI/NI input/output device 2004. In a preferred embodiment, Newprom award status device 2000 is on a LAN 2010 or in another operable communication with a server and back-end database 2012.

Newprom award status device 2000 will present the player with several kinds of output and information, depending on the players' desires, and if the player has presented standalone Newprom awards (typically a voucher) or has presented an ID. Some players may not wish to have all their Newprom awards displayed when presenting an ID, so the button selections at the bottom of the device allow a player to choose hardcopy output from printer 2006 (more private) or a video display on screen 2002 (more public). In addition, if the player is new, the player may ask for a printed map of the casino, where the times and gaming devices on which the presented Newprom awards can be used is highlighted. The player has a choice of printing the map on hardcopy, output by standard printing means at output slot 2006, or to display the information on screen 2002.

If the player presented an ID, the player may choose to view all of the Newprom awards associated with the presented ID from the back-end database, or may ask to be shown a subset. The subset will usually be based on time (i.e., the player will ask what Newprom awards are available to use in the next 24 hours).

In one embodiment, Newprom award status device 2000 is a standalone kiosk. In another embodiment, the Newprom award status device contained within a gaming device. In such cases there will be a button, typically on a touchscreen, that the player uses to indicate to the machine that the player wants a Newprom award status check. After getting their readout, the player will then have the choice of using this gaming device or of simply recovering their Newprom awards.

In a casino or establishment that uses game states (game state saving as discussed earlier) and Newprom awards, a preferred embodiment is to use both a back-end database and a transportable media solution. The back-end database will keep records for each of the types of data associated with a player, then recall them when the player presents a player ID or a voucher ID. For many players, especially those playing relatively short amounts of time at anyone visit, the general bearer instrument (GBI) solution is best. General bearer instruments (GBIs) are instruments that can be easily carried by a person and contain the information needed for Newprom awards and game states. In addition, these instruments will be suited for multi-game game state saving as well. In a preferred embodiment, GBIs will be voucher-based, printed as needed at the gaming devices or special GBI devices.

Figure 21:
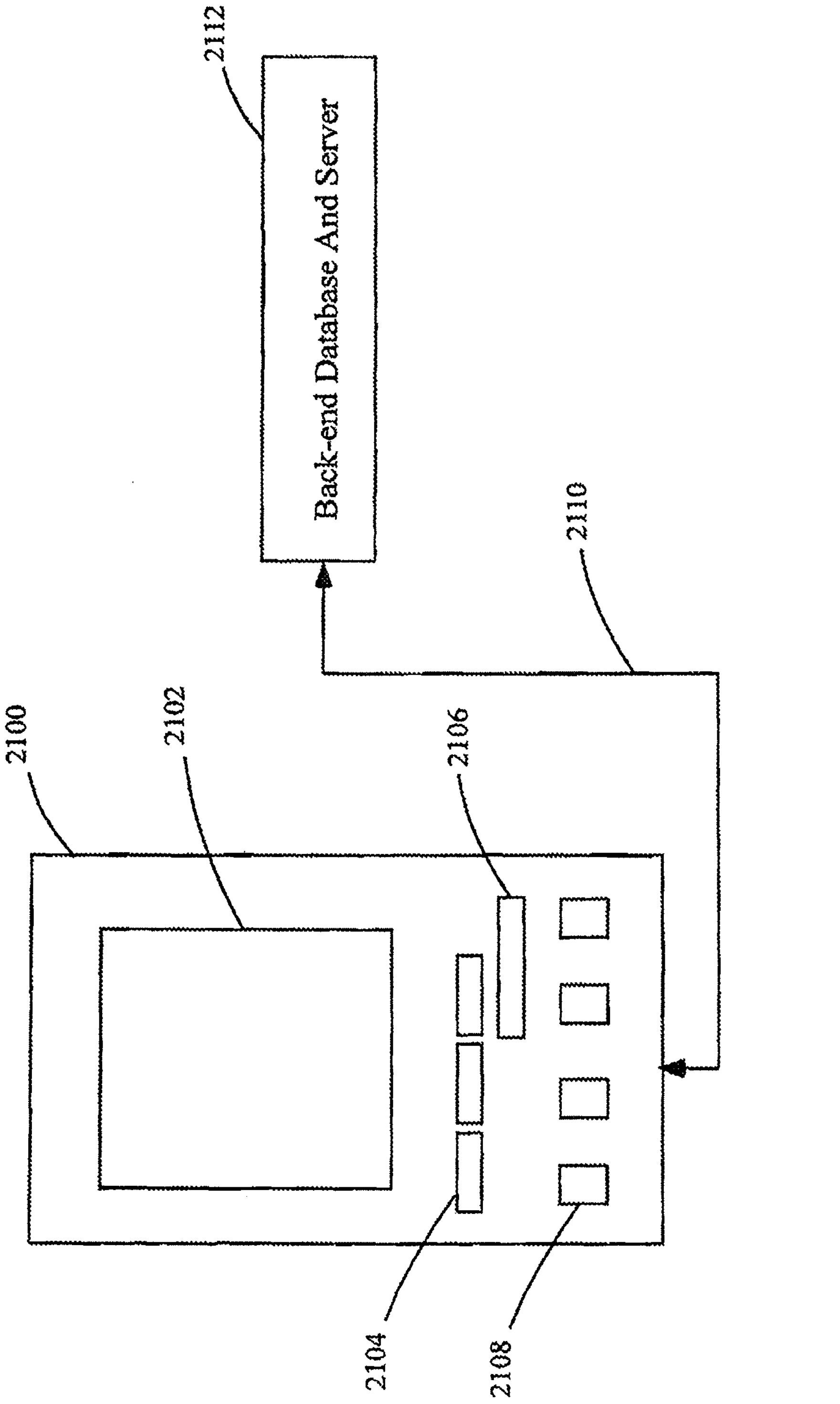
FIG. 21 is a functional block diagram of a GBI service station.
Figure 22:
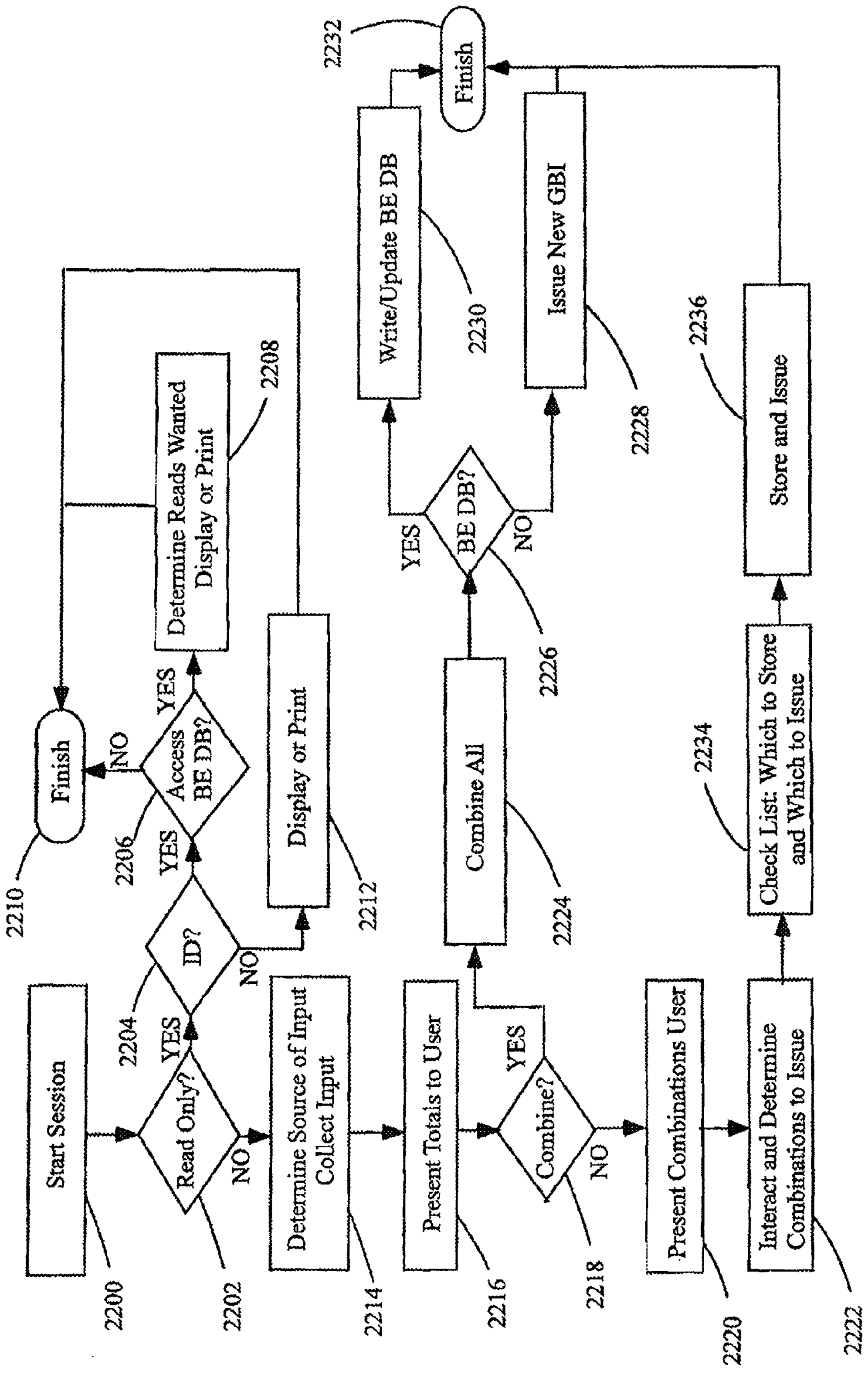
FIG. 22 is a flow diagram showing an example use of a GBI service station.

It is envisioned that casual players may well end up carrying multiple instruments after a while. To help them, as well as provide other related services, the GBI service station will be provided. FIG. 21 shows a functional block diagram of a GBI service station. Because the complexity of the interaction at the GBI service station is much higher than that of the Newprom award status device shown in FIG. 20, a preferred embodiment will have a minimum number (if any) "hard" buttons, shown generally as buttons 2108. These hard buttons may provide a few preliminary choices, such as screen display or print-only, and read-out only functions (read-only functions are provided for people who forget what a PBI, GSI, NI, or GBI has on it; it provides an English, Spanish, Japanese, or other language translation of what the instrument has on it, and then returns the instrument without further processing). An implementation using hard buttons may be preferred if the GBI service station has limited capabilities; for example one that only provides reading services and nothing else.

GBI service stations will also have at least one input slot, shown as 2104, and may have more than one. A minimal configuration will have an input slot for voucher-based PBIs, GBIs, NIs, and GBIs. Optional slots may be for magnetic cards, smart cards, player's cards, and related instruments carried by people. There will also be at least one printer output port, shown as slot 2106. Also shown is a video display 2102, further being a touchscreen for user input. The GBI service station will preferably be connected to the establishment's or casino's back-end database 2112 via a LAN 2110 or functionally equivalent means. Being connected to a back-end database is optional; a subset of the GBI service station's primary functions can still be carried out without the connection, and in some installations (for security or other reasons), it may be desirable to have one or more GBI service stations installed unconnected.

The functionality provided by the GBI service station is geared towards helping users manage and understand any and all instruments and/or awards or credits they may have. This will be especially helpful to occasional users who do not play enough to "memorize" the meaning of the various instruments and awards. The user starts a session by pressing a hard button for certain limited functions or inserting any applicable instrument in its respective slot (i.e., player's card in a player card slot, PBI in the voucher reader slot). This action corresponds to entry box 2200 in FIG. 22.

The user initially decides if they want a read-only session at decision diamond 2202. If the answer is yes, the "YES" exit is taken to decision diamond 2204. If the user has presented a form of ID to the GBI service station (rather than some form of credit), the "YES" exit is taken from decision diamond 2204 to decision diamond 2206. If the GBI service station can access a back-end database and the ID is recognized, the "YES" exit is taken to box 2208. Action in box 2208 includes asking if the user wants a display or a print-out, and then providing the user with the current state of any credits in the back-end database associated with the ID presented. Box 2208 is then left and the process finishes at finish 2210.

If, at decision diamond 2206, the ID was not recognized the process finishes immediately at finish point 2210 (e.g., with a polite message to that effect on the screen). If, at decision diamond 2204, the user presented something other than an ID, the "NO" exit is taken and box 2212 entered. Action taken in box 2212 is to ask if the user wants the information in hardcopy or video form, present the information to the user in that manner, return the instrument to the user, and proceed to finish the transaction at finish 2210.

If, at decision diamond 2202 the answer was "NO," the user wants to do something more than have something read. The "NO" exit is taken to box 2214. Action taken in box 2214 is to determine from the user where to get input, and then to present all information to the user in total. There are basically two places from which data can be gathered. One is from instruments carried by the user, and the other is from a back-end database. If the user requests information from a back-end database, the user is asked for ID. The ID can take any form, from a voucher ID to a player's card to a PIN. The user is then asked to submit instruments until they have no more (i.e., PBIs, GSIs, NIs, and/or GBIs). Once the user indicates to the GBI service station all sources of credits has been accumulated, the GBI service station combines like data and reaches a total. Combining like data consists of combining award credits, consolidating game state information for the same gaming device, combining Newprom awards if they can be, and the like. Much, if not most, of the data will not be able to be combined, it will simply be listed in order. An example of hard to combine data will typically be Newprom awards. Newprom awards will tend to have such variability that they typically will not combine or consolidate. On the other hand, award credits will always combine. Box 2214 is left and box 2216 entered.

The action in box 2216 is to present the information to the user in the most coherent manner possible. As before, the user may choose hardcopy or video output. Box 2216 is then left for decision diamond 2218.

In decision diamond 2218 the user is asked if they want to combine credits that are combinable and re-issue the rest in as compact a form as possible. If the answer is yes, the "YES" exit is taken to box 2224. The action taken in box 2224 is to do the combinations possible, remove redundant or expired credits, and the like. These calculations may be done in the GBI service station or in a back-end server in a networked environment. Box 2224 is then left for decision diamond 2226.

At decision diamond 2226 the user is asked if they want to store the information on a back-end database or if they want the credits re-issued to them in an instrument form, typically GBI vouchers. If the answer is yes to the back-end database storage, the "YES" exit is taken and box 2230 is entered. Please note that if the GBI service station in use is not networked, clearly the "NO" exit is taken from this decision diamond.

In box 2230, the back-end database determines if the current user has an ID. If they do, the data is recorded in records associated with that ID. If not, the user is issued a voucher ID or equivalent, and the data is then stored on the database using the newly-issued ID. The process finishes by then entering finish 2232.

If the user indicated no at decision diamond 2226, then the "NO" exit is taken to box 2228. The action taken is to issue a new GBI to the user that incorporates all the valid credits listed for the user, including any combined credits. The process then finishes by leaving box 2228 and entered finish 2232.

If, at decision point 2218 the user answered no, the "NO" exit is taken to box 2220. Action taken in box 2220 is to instruct the user on possible combinations. For example, a user may want a separate Newprom award voucher (to give to a friend to use), or may want to divide up any award credits into even amounts on several different vouchers to distribute to friends. Any combination of vouchers may be created for the user. Box 2220 is left, and box 2222 is entered.

Action in box 2222 is to put up interactive screens and determine the combination of vouchers the user wants the GBI service station to produce. After determining a set of vouchers equal in value to the credits and vouchers presented to the GBI service station at the start of the session, box 2222 is left and box 2234 is entered.

The action in box 2234 is to present a list to the user of the newly combined credits and/or game states, and ask which are to be stored in a back-end database and which are to be issued as newly generated GBIs. The user indicates which are to be stored and which are to be issued in a GBI form. Box 2234 is left and box 2236 is entered. The action taken in box 2236 is to store and/or issue the GBIs the user requested. As with box 2230, if the user currently has no ID for the database and requested some of the newly recombined credits or game states be stored on a back-end database, a voucher ID or equivalent will be given to the user at this time. The process now exits box 2236 and finishes by entering finish 2232.

The disclosure has been partially described using flow charts. As will be understood by a person of ordinary skill in the art and with the benefit of the present disclosure, steps described in the flow charts can vary as to order, content, allocation of resources between steps, times repeated, and similar variations while staying fully within the inventive concepts disclosed herein.

Accordingly, it will be seen that this disclosure provides a system and method for maintaining player's award credits, gaming states not associated directly with award credits, and provides for Newprom awards in a gaming environment. A player may restore award credits and/or other game state from previously played games when the previously played games are the same game device or from a similarly constructed game. This disclosure also provides for Newprom awards, allowing credits to be awarded for non-gaming events and based on non-gaming criteria. Although the disclosure above contains much specificity, the disclosure should not be construed as limiting the scope of the invention but as merely providing an illustration of the presently preferred embodiment of the invention. The scope of this invention should be determined by the appended claims and their legal equivalents.

What is claimed:

1. A method for enhancing game play on a gaming machine having a processor, a memory, and program logic stored in the memory executable to play at least one base game in exchange for a wager, the method comprising:

receiving, by the gaming machine, a Newprom award not issued by the gaming machine; and altering, using the processor, the at least one base game to an enhanced base game state in response to the processor processing the received Newprom award, wherein the Newprom award is configured to add one or more base game play enhancements available to a player only by way of the Newprom award to the at least one base game, thereby altering the at least one base game to the enhanced base game state so that the at least one base game is played with the one or more game play enhancements, wherein the game play enhancements comprise a change in a game play, game format, game style or game type of the at least one base game, additional pay lines to the at least one base game, additional winning indicia for the at least one base game, or any combination thereof.

2. The method of claim 1, wherein the Newprom award includes time restriction data having a predetermined, fixed expiration date for the Newprom award.

3. The method of claim 1, wherein the Newprom award includes location restriction data that restricts use of the Newprom award to a predetermined location or a predetermined set of locations.

4. The method of claim 1, wherein the Newprom award includes gaming device restriction data that restricts use of the Newprom award to a particular game, a set of related games, a family of games, or a predetermined subset of games.

5. The method of claim 1, wherein altering the at least one base game further comprises providing a new pay table for the game in response to the Newprom award.

6. The method of claim 1, wherein altering the at least one base game further comprises applying a multiplier to any winning outcomes of the game.

7. The method of claim 1, further comprising issuing a Newprom award to the player during a gaming session.

8. The method of claim 1, further comprising issuing a Newprom award to the player at the conclusion of a gaming session.

9. A method for enhancing game play on a gaming machine having a processor, a memory, and program logic stored in the memory executable to play at least one base game in exchange for a wager, the method comprising:

receiving, by the gaming machine, a Newprom award not obtained at the gaming machine; and altering, using the processor, the at least one base game to an enhanced base game state in response to the processor processing the received Newprom award, wherein the Newprom award is configured to add one or more base game play enhancements available to a player only by way of the Newprom award to the at least one base game, thereby altering the at least one base game to the enhanced base game state so that the at least one base game is played with the one or more game play enhancements, wherein the game play enhancements comprise a change in a game play, game format, game style or game type of the at least one base game, additional pay lines to the at least one base game, additional winning indicia for the at least one base game, or any combination thereof.

10. The method of claim 9, wherein receiving player input further comprises:

accepting player identification; and retrieving a Newprom award that is associated with the player identification.

11. The method of claim 9, wherein the Newprom award includes time restriction data having a predetermined, fixed expiration date for the Newprom award.

12. The method of claim 9, wherein the Newprom award includes location restriction data that restricts use of the Newprom award to a predetermined location or a predetermined set of locations.

13. The method of claim 9, wherein the Newprom award includes gaming device restriction data that restricts use of the Newprom award to a particular game, a set of related games, a family of games, or a predetermined subset of games.

14. The method of claim 9, wherein altering the at least one game further comprises providing a new pay table for the at least one base game in response to the Newprom award.

15. The method of claim 9, wherein altering the at least one base game further comprises applying a multiplier to any winning outcomes of the game.

16. The method of claim 9, further comprising issuing a Newprom award to the player during a gaming session.

17. The method of claim 9, further comprising issuing a Newprom award to the player at the conclusion of a gaming session.

18. A method for enhancing game play on a gaming machine having a processor, a memory, and program logic stored in the memory executable to play at least one base game in exchange for a wager, the method comprising:

receiving, by the gaming machine, a Newprom award not issued by the gaming machine; and altering, using the processor, the at least one base game to an enhanced base game state in response to the processor processing the received Newprom award, wherein the Newprom award is configured to add one or more base game play enhancements available to a player only by way of the Newprom award to the at least one base game, thereby altering the at least one base game to the enhanced base game state so that the at least one base game is played with the one or more game play enhancements, wherein the one or more base game play enhancements invoke one or more unique states in the play of the at least one base game that are not available without the one or more base game play enhancements.

19. The method of claim 18, further comprising issuing a Newprom award to the player during a gaming session.

20. The method of claim 18, further comprising issuing a Newprom award to the player at the conclusion of a gaming session.

* * * * *

UNITED STATES PATENT AND TRADEMARK OFFICE

CERTIFICATE OF CORRECTION

PATENT NO. : 8,469,802 B2
APPLICATION NO. : 13/301711
DATED : June 25, 2013
INVENTOR(S) : Robert Anthony Luciano, Jr., Robert William Crowder, Jr. and Russ F. Marsden It is certified that error appears in the above-identified patent and that said Letters Patent is hereby corrected as shown below:

In the Specification

Column 2, In line 35, add --s-- to “require”
Column 7, In line 21, add --,-- after “Rather”
Column 7, In line 62, delete “s” from “services”
Column 8, In line 56, add --a-- after “select”
Column 16, In line 56, replace --by-- with “be”
Column 17, In line 17, add --as-- after “used”
Column 18, In line 18, add --of the-- after “level”
Column 19, In line 48, add --a-- after “for”
Column 20, In line 40, replace --addition-- with “additional”
Column 20, In line 65, add --and-- after “change”
Column 21, In line 56, delete “the” after “on”
Column 21, In line 65, add --of-- after “number”
Column 24, In line 40, add --be-- after “readily”
Column 24, In line 40, add --by-- after “accomplished”
Column 24, In line 48, add --,-- after “element”
Column 25, In line 9, replace --take-- with “taken”
Column 25, In line 61, replace --where-- with “were”
Column 25, In line 63, replace --time-played-- with “time-based”
Column 25, In line 66, replace --contiguous-- with “continuous”
Column 26, In line 29, replace --US)-- with “US))”
Column 26, In line 57, replace --on-- with “in”
Column 26, In line 61, replace --assess-- with “assesses”
Column 27, In line 12, replace --my-- with “may”
Column 27, In line 31, add --,-- after “display)”
Column 27, In line 33, replace --remained-- with “remaining”
Column 28, In line 33, add --is-- after “device”
Column 28, In line 47, replace --anyone-- with “any one”

Signed and Sealed this
Eighteenth Day of March, 2014

Michelle K. Lee

Michelle K. Lee
*Deputy Director of the United States Patent and Trademark Office*

Column 29, In line 44, add --,-- after “recognized”
Column 29, In line 65, replace --has-- with “have”